United States Patent
Miyazaki et al.

(10) Patent No.: US 11,029,577 B2
(45) Date of Patent: Jun. 8, 2021

(54) OPTICAL MODULATOR AND OPTICAL TRANSMISSION APPARATUS USING THE SAME

(71) Applicant: SUMITOMO OSAKA CEMENT CO., LTD., Tokyo (JP)

(72) Inventors: Norikazu Miyazaki, Tokyo (JP); Toru Sugamata, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 0 days.

(21) Appl. No.: 16/665,218

(22) Filed: Oct. 28, 2019

(65) Prior Publication Data

US 2020/0292909 A1 Sep. 17, 2020

(30) Foreign Application Priority Data

Mar. 11, 2019 (JP) .............................. JP2019-044149

(51) Int. Cl.
*G02F 1/225* (2006.01)
*G02F 1/21* (2006.01)

(52) U.S. Cl.
CPC ............ *G02F 1/2255* (2013.01); *G02F 1/212* (2021.01)

(58) Field of Classification Search
CPC .......................... G02F 1/2255; G02F 2001/212
USPC .......................................................... 385/40
See application file for complete search history.

(56) References Cited

U.S. PATENT DOCUMENTS

| | | | | |
|---|---|---|---|---|
| 2016/0161771 A1* | 6/2016 | Sugiyama | ............ | G02B 6/4281 385/3 |
| 2018/0059503 A1* | 3/2018 | Miyazaki | ............. | H04B 10/505 |
| 2018/0284488 A1* | 10/2018 | Ishikawa | ............... | G02F 1/2255 |

FOREIGN PATENT DOCUMENTS

JP 2018-106091 7/2018

\* cited by examiner

*Primary Examiner* — Jerry M Blevins
(74) *Attorney, Agent, or Firm* — Rankin, Hill & Clark LLP

(57) ABSTRACT

An optical modulator includes an optical modulation element having a plurality of signal electrodes; a housing that houses the optical modulation element; a plurality of signal input terminals each of which inputs an electrical signal to be applied to each of the signal electrodes; and a relay substrate on which a plurality of signal conductor patterns that electrically connect each of the signal input terminals to each of the signal electrodes, and a plurality of ground conductor patterns are formed, in which the relay substrate is housed in the housing, and at least one input side ground conductor pattern extending from at least one of the ground conductor patterns is formed on an input side surface having a side on which an electrical signal output from the signal input terminal is input to the signal conductor pattern as one side.

12 Claims, 11 Drawing Sheets

DETAILED PART A

DETAILED PART B

CROSS-SECTIONAL VIEW TAKEN ALONG XIV – XIV

OPTICAL MODULATOR AND OPTICAL TRANSMISSION APPARATUS USING THE SAME

CROSS-REFERENCE TO RELATED APPLICATIONS

This application claims the benefit of Japanese Patent Application No. 2019-044149 filed Mar. 11, 2019, the disclosure of which is herein incorporated by reference in its entirety.

BACKGROUND OF THE INVENTION

Field of the Invention

The present invention relates to an optical modulator including a relay substrate that relays propagation of an electrical signal between a signal input terminal and an optical modulation element electrode, and an optical transmission apparatus using the optical modulator.

Description of Related Art

In a high-speed/large-capacity optical fiber communication system, an optical modulator incorporating a waveguide type optical modulation element is often used. Among them, an optical modulation element using $LiNbO_3$ (hereinafter also referred to as LN) having an electro-optic effect for a substrate can realize high-bandwidth optical modulation characteristics with a small light loss, so the optical modulation element is widely used in high-speed/large-capacity optical fiber communication systems.

The optical modulation element using the LN substrate includes Mach-Zehnder type optical waveguides and signal electrodes for applying a high-frequency signal as a modulation signal to the optical waveguides. Then, the signal electrodes provided in the optical modulation element are connected to lead pins and connectors that are signal input terminals provided on the housing, through a relay substrate provided in the housing of the optical modulator that houses the optical modulation element. Thus, since the lead pins and connectors that are signal input terminals are connected to a circuit board on which an electronic circuit for causing the optical modulator to perform a modulation operation, an electrical signal output from the electronic circuit is applied to the signal electrodes of the optical modulation element through the relay substrate.

Due to the increasing transmission capacity in recent years, the main stream of modulation methods in optical fiber communication systems is multi-level modulation and the transmission format adopting polarized wave multiplexing for multi-level modulation, such as Quadrature Phase Shift Keying (QPSK) and Dual Polarization-Quadrature Phase Shift Keying (DP-QPSK), which are used in fundamental optical transmission networks and is also being introduced into a metro networks.

An optical modulator that performs QPSK modulation (QPSK optical modulator) and an optical modulator that performs DP-QPSK modulation (DP-QPSK optical modulator) include a plurality of Mach-Zehnder optical waveguides having a so-called nested structure called a nested type, each of which has at least one signal electrode. Therefore, the optical modulators are provided with a plurality of signal electrodes, and the above-described DP-QPSK modulation operation is performed in cooperation with high-frequency electrical signals applied to the signal electrodes.

In such an optical modulator in which high-frequency electrical signals applied to the plurality of signal electrodes cooperate, all high-frequency electrical signals need to be input to the signal electrodes of the optical modulator without being affected by noise or the like, so it is essential to effectively reduce leakage and reflection of high-frequency electrical signals on the relay substrate. In particular, when the size of the relay substrate is further reduced due to the demand for miniaturization of the optical modulator, a plurality of different high-frequency electrical signals are concentrated and propagated on the narrow relay substrate, and the leakage and radiation of the high-frequency electrical signal in the relay substrate can interfere with each other and easily act as noise.

In the related art, in order to suppress high-frequency reflection, radiation, and/or leakage at the relay substrate as described above, the impedance at the connection portion between the conductor pattern of the relay substrate and the lead pin is matched with higher accuracy to the impedance of the high-frequency transmission channel formed by the conductor pattern and lead pin (for example, Japanese Laid-open Patent Publication No. 2018-106091).

However, in addition to the demand for miniaturization of the optical modulator, the demand for increasing the transmission capacity is unchanged, and if the increase in the modulation speed required for DP-QPSK modulation progresses, it is required to further suppress the reflection and radiation of the high-frequency signal generated in the relay substrate. For example, the DP-QPSK modulators which are currently being used operate at a transmission rate of 100 Gb/s, but in a case where the transmission rate is increased to 400 Gb/s or higher, in order to further suppress the influence of the reflection and radiation of the high-frequency signal generated in the relay substrate on the optical modulation operation, a new configuration measure is required in addition to or instead of the configuration of the optical modulator in the related art.

Further, the solder or brazing material used when fixing the relay substrate to the housing is fixed to the side surface of the relay substrate in an amorphous state, resulting in a variation in impedance on the relay substrate, thereby inhibiting stable propagation of electrical signals. Such a problem has become larger as the transmission rate becomes higher (cannot be ignored).

SUMMARY OF THE INVENTION

From the above background, in an optical modulator including a relay substrate that electrically connects each of the signal electrodes of the optical modulation element to each of the signal input terminals, the influence of reflection, radiation, and leakage of the electrical signal generated at the relay substrate or its surroundings is further reduced, and thus even in a case where the transmission rate becomes higher than 400 Gb/s, there is a need to realize good optical modulation characteristics.

According to an aspect of the present invention, there is provided an optical modulator including an optical modulation element having a plurality of signal electrodes; a housing that houses the optical modulation element; a plurality of signal input terminals each of which inputs an electrical signal to be applied to each of the signal electrodes; and a relay substrate on which a plurality of signal conductor patterns that electrically connect each of the signal input terminals to each of the signal electrodes, and a plurality of ground conductor patterns are formed, in which the relay substrate is housed in the housing, and at least one input side ground conductor pattern extending from at least one of the ground conductor patterns is formed on an input side surface having a side on which an electrical signal output from the signal input terminal is input to the signal conductor pattern as one side.

According to another aspect of the present invention, an input ground recess portion extending from a rear surface of the relay substrate facing a front surface on which the signal conductor pattern is formed is formed on the input side surface, and at least a part of the input side ground conductor pattern is provided inside the input ground recess portion.

According to another aspect of the present invention, the input ground recess portion extends to both the front surface and the rear surface, and the input side ground conductor pattern is formed inside the input ground recess portion.

According to another aspect of the present invention, at least one side signal conductor pattern extending from at least one of the signal conductor patterns is further formed on the input side surface.

According to another aspect of the present invention, a signal recess portion extending from a surface on which the signal conductor patterns are formed is formed on the input side surface, and at least a part of the side signal conductor patterns is formed inside the signal recess portion.

According to another aspect of the present invention, the relay substrate has at least one output side ground conductor pattern extending from at least one of the ground conductor patterns formed on an output side surface having a side on which an electrical signal output to the signal electrode from the signal conductor pattern as one side.

According to another aspect of the present invention, an output ground recess portion extending from a rear surface of the relay substrate is formed on the output side surface, and at least a part of the output side ground conductor pattern is provided inside the output ground recess portion.

According to another aspect of the present invention, the signal input terminal and the signal conductor pattern are electrically connected to each other by using solder, brazing material, or conductive adhesive, and the signal conductor pattern and the signal electrode are electrically connected to each other through a conductor wire or a conductor ribbon.

According to another aspect of the present invention, the input side surface of the relay substrate is in contact with a structure connected to a ground potential, and an input side ground conductor pattern provided on the input side surface is electrically connected to the structure.

According to another aspect of the present invention, a housing that houses the optical modulation element and the relay substrate is provided, and the structure is connected to aground potential through the housing.

According to another aspect of the present invention, the structure is a housing that houses the optical modulation element and the relay substrate. Another aspect of the present invention is an optical transmission apparatus including any one of the optical modulators described above and an electronic circuit that outputs an electrical signal for causing the optical modulator to perform a modulation operation.

According to the present invention, in an optical modulator including a relay substrate, the influence of reflection, radiation, and leakage of the electrical signal generated at the relay substrate or its surroundings is further reduced, and even in a case where the transmission rate becomes higher than 400 Gb/s, good optical modulation characteristics can be realized.

DETAILED DESCRIPTION OF THE INVENTION

Hereinafter, embodiments of the present invention will be described with reference to the drawings.

First Embodiment

Figure 1:
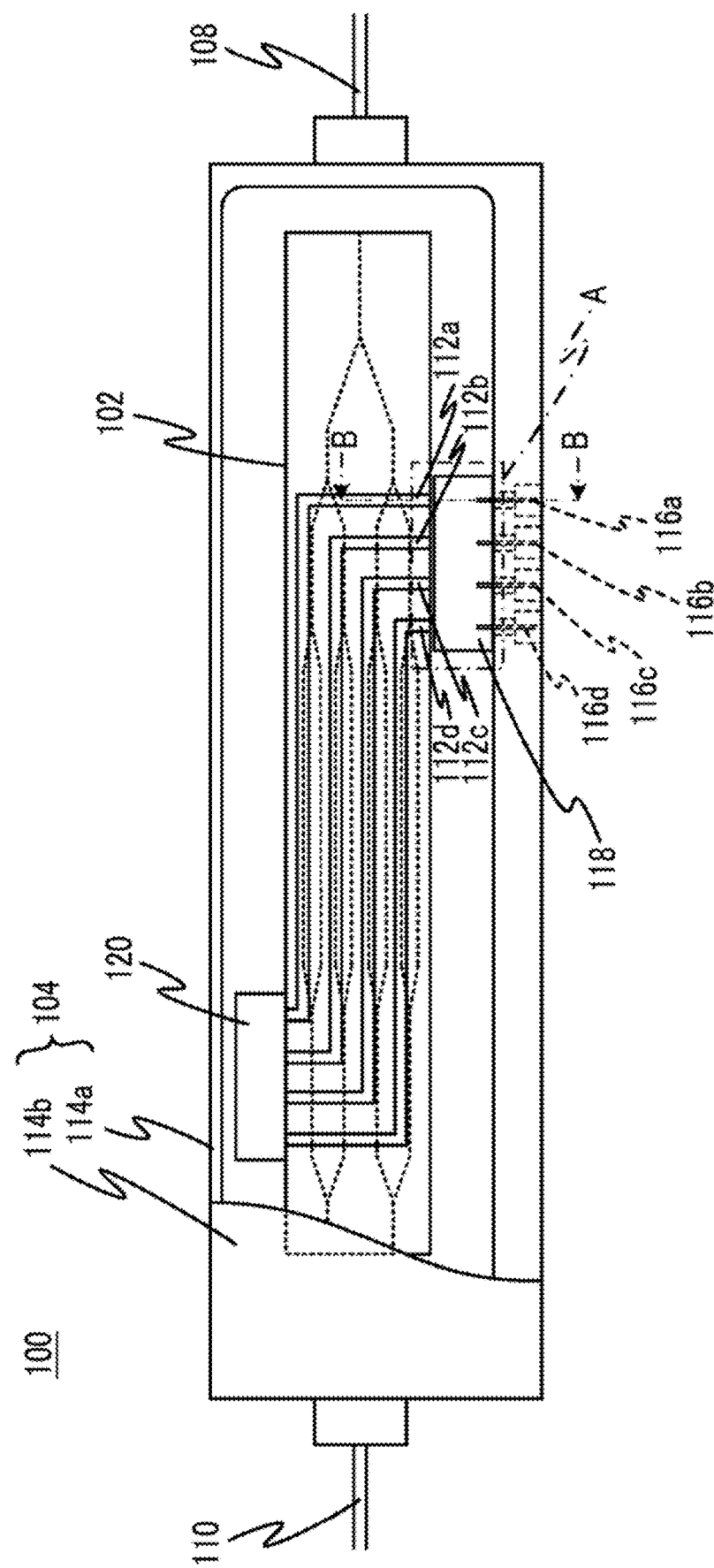
FIG. 1 is a plan view of an optical modulator according to a first embodiment of the present invention.
Figure 2:
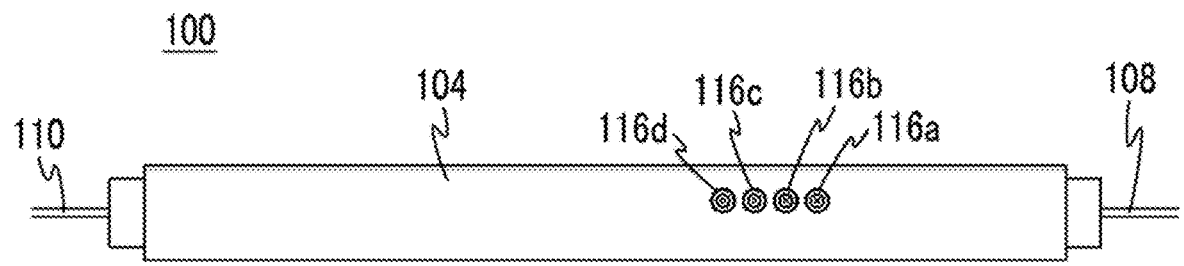
FIG. 2 is a side view of the optical modulator shown in FIG. 1.

First, a first embodiment of the present invention will be described. FIGS. 1 and 2 are diagrams showing a configuration of an optical modulator according to the first embodiment of the present invention. Here, FIGS. 1 and 2 are a plan view and a side view of an optical modulator 100, respectively.

The optical modulator 100 includes an optical modulation element 102, a housing 104 that houses the optical modulation element 102, an input optical fiber 108 for entering light into the optical modulation element 102, and an output optical fiber 110 that guides the light output from the optical modulation element 102 to the outside of the housing 104.

The optical modulation element 102 includes, for example, four Mach-Zehnder type optical waveguides provided on an LN substrate. The four Mach-Zehnder type optical waveguides are provided with four signal electrodes 112a, 112b, 112c, and 112d that respectively modulate light waves propagating through the Mach-Zehnder type optical waveguide. As known in the related art, on the surface of the LN substrate of the optical modulation element 102, for example, ground electrodes 122a, 122b, 122c, 122d, and 122e (not shown in FIG. 1, and shown in FIG. 3) constituting a coplanar waveguide (CPW) are provided for the four signal electrodes 112a, 112b, 112c, and 112d.

Specifically, the ground electrodes are disposed so as to hold the signal electrodes 112a, 112b, 112c, and 112d therebetween in the plane of the LN substrate surface, and constitute a coplanar waveguide having a predetermined characteristic impedance in a predetermined operating frequency together with the four signal electrodes 112a, 112b, 112c, and 112d.

The optical modulation element 102 is a DP-QPSK modulator that performs optical modulation of 400 Gb/s, for example, and four high-frequency electrical signals (modulation signals) are input to the four signal electrodes 112a, 112b, 112c, and 112d, respectively. These electrical signals cooperate to control the propagation of the light wave in the four Mach-Zehnder type optical waveguides, and perform the operation of DP-QPSK modulation of 400 Gb/s as a whole.

The two light rays output from the optical modulation element 102 are polarized and combined by a lens optical system (not shown), for example, and guided to the outside of the housing 104 through the output optical fiber 110.

The housing 104 includes a case 114a to which the optical modulation element 102 is fixed and a cover 114b. In order to facilitate understanding of the configuration inside the housing 104, only a part of the cover 114b is shown on the left side in FIG. 1, but actually, the cover 114b is disposed to cover the entire box-shaped case 114a and hermetically seals the inside of the housing 104. The case 114a is made of a metal or a ceramic plated with gold, for example, and functions electrically as an electric conductor. The housing 104 is usually provided with a plurality of pins for DC control or the like, which are omitted in FIG. 1.

The case 114a includes electrical connectors 116a, 116b, 116c, and 116d having signal input terminals 124a, 124b, 124c, and 124d for inputting high-frequency electrical signals respectively applied to the signal electrodes 112a, 112b, 112c, and 112d of the optical modulation element 102. In addition, a relay substrate 118 is accommodated in the housing 104. As will be described later, the relay substrate 118 has signal conductor patterns 330a, 330b, 330c, and 330d that electrically connect the signal input terminals 124a, 124b, 124c, and 124d and the signal electrodes 112a, 112b, 112c, and 112d of the optical modulation element 102 respectively, and ground conductor patterns 340a, 340b, 340c, 340d, and 340e.

Each of the electrical signals input from the signal input terminals 124a, 124b, 124c, and 124d is input to one end of each of the signal electrodes 112a, 112b, 112c, and 112d of the optical modulation element 102 through the relay substrate 118. The other ends of the signal electrodes 112a, 112b, 112c, and 112d are terminated by a terminator 120 having a predetermined impedance. Thus, the electrical signals input to the one ends of the signal electrodes 112a, 112b, 112c, and 112d propagate in the signal electrodes 112a, 112b, 112c, and 112d as traveling waves.

Each of the electrical connectors 116a, 116b, 116c, and 116d is, for example, a socket of a push-on type coaxial connector. The cylindrical ground conductors of these electrical connectors 116a, 116b, 116c, and 116d are electrically connected and fixed to the case 114a. Therefore, the case 114a corresponds to a structure connected to the ground potential. The signal input terminals 124a, 124b, 124c, and 124d are, for example, center conductors (core wires) extending along the cylindrical center lines of the ground conductors in the connector sockets that are the electrical connectors 116a, 116b, 116c, and 116d.

Figure 3:
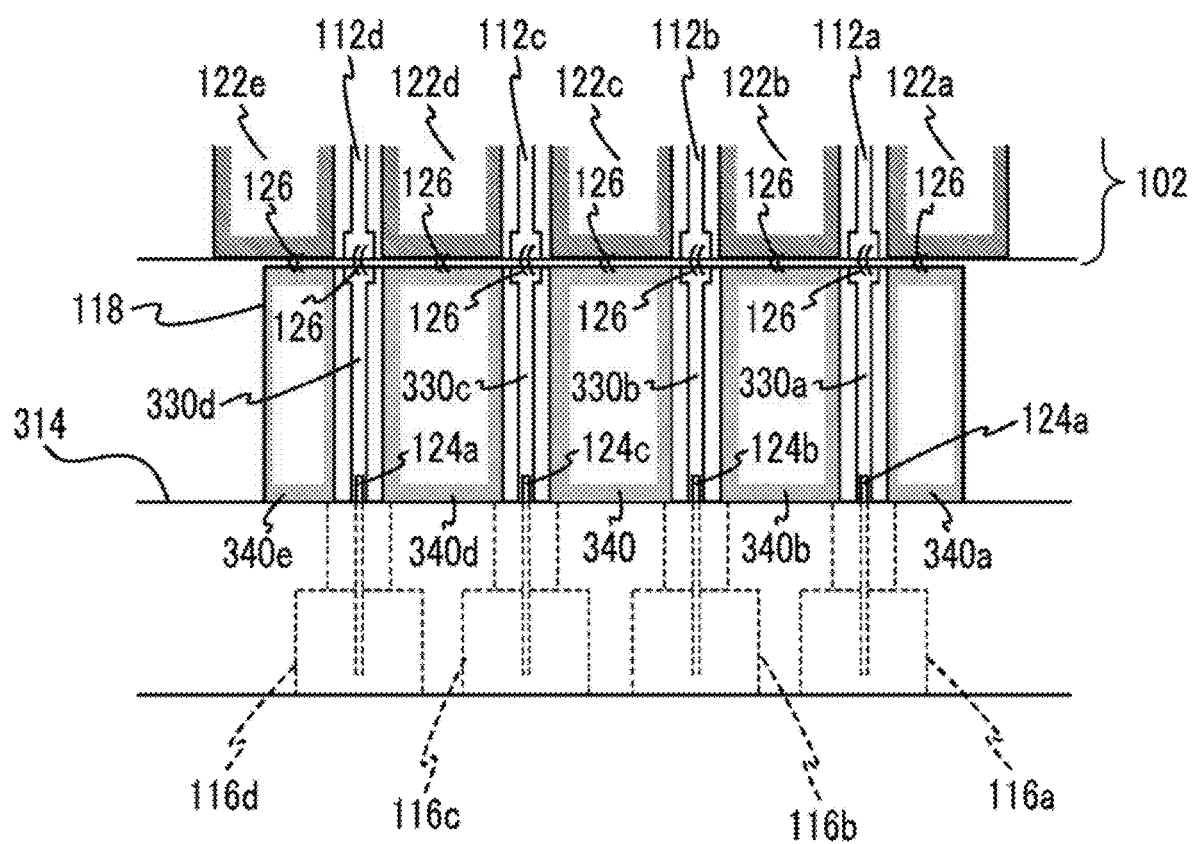
FIG. 3 is a detailed view of part A of the optical modulator shown in FIG. 1.
Figure 4:
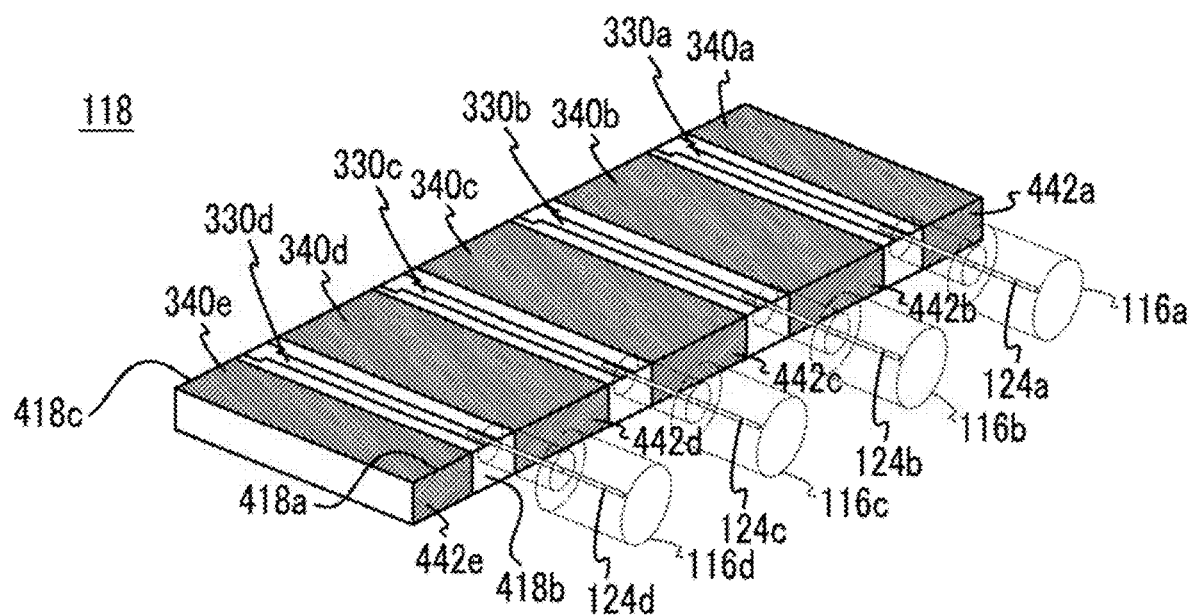
FIG. 4 is a perspective view of a front surface of a relay substrate used in the optical modulator shown in FIG. 1 as viewed from a side where signal input terminals are disposed.
Figure 5:
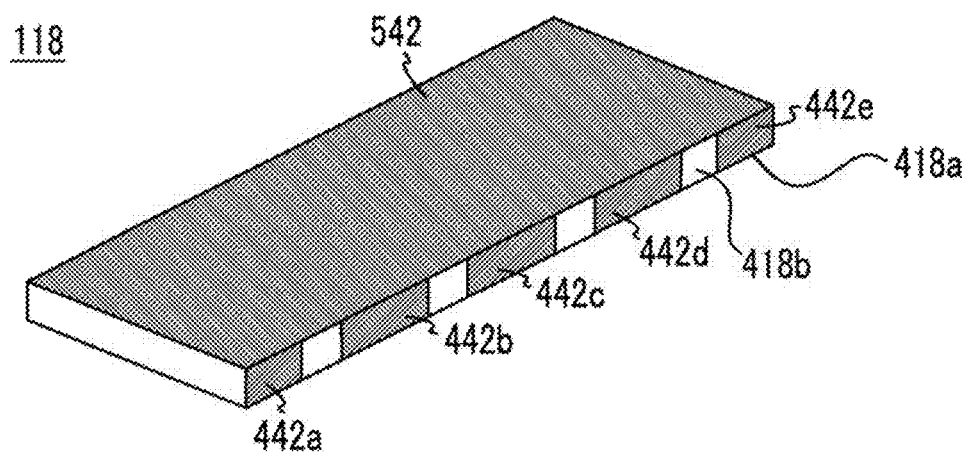
FIG. 5 is a perspective view of a rear surface of the relay substrate used in the optical modulator shown in FIG. 1 as viewed from a side where signal input terminals are disposed.
Figure 6:
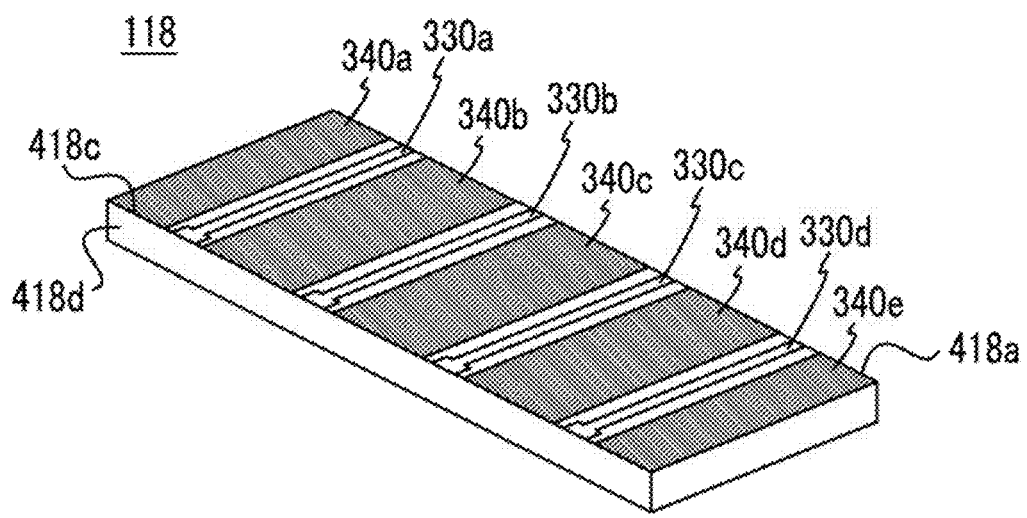
FIG. 6 is a perspective view of the front surface of the relay substrate used in the optical modulator shown in FIG. 1 as viewed from a side where an optical modulation element is disposed.

FIG. 3 is a partial detail view of a part A in FIG. 1, and shows a configuration of the relay substrate 118 and its surroundings. FIG. 4 is a perspective view of a front surface of a single relay substrate 118 as viewed from the side where the signal input terminal 124a is disposed, and FIG. 5 is a perspective view of a rear surface (that is, a surface opposed to a front surface) of the single relay substrate 118 viewed from the side where the signal input terminal 124a is disposed. FIG. 6 is a perspective view of the front surface of the single relay substrate as viewed from the side where the optical modulation element 102 is disposed.

The signal conductor patterns 330a, 330b, 330c, and 330d and the ground conductor patterns 340a, 340b, 340c, 340d, and 340e are provided on the front surface of the relay substrate 118 (the surfaces illustrated in FIGS. 1 and 3).

The ground conductor patterns 340a, 340b, 340c, 340d, and 340e are provided so as to sandwich the signal conductor patterns 330a, 330b, 330c, and 330d within the surface of the front surface of the relay substrate 118, respectively. Thus, the signal conductor patterns 330a, 330b, 330c, and 330d form a coplanar line together with the ground conductor patterns 340a, 340b, 340c, 340d, and 340e, respectively.

As shown in FIG. 3, the signal electrodes 112a, 112b, 112c, 112d of the optical modulation element 102 are electrically connected to one ends of the signal conductor patterns 330a, 330b, 330c, and 330d of the relay substrate 118, respectively, by wire bonding using the conductor wires 126, for example. Here, the conductor wire 126 can be a gold wire, for example.

Further, in the optical modulation element 102, the ground electrodes 122a, 122b, 122c, 122d, and 122e that constitute the coplanar line together with the signal electrodes 112a, 112b, 112c, and 112d are electrically connected to one ends of the ground conductor patterns 340a, 340b, 340c, 340d, and 340e of the relay substrate 118, respectively, by wire bonding using the conductor wires 126, for example, in the same manner as described above. The wire bonding using the conductor wire 126 described above is an example, and the present invention is not limited to this. Instead of wire bonding of the conductor wire 126, ribbon bonding using a conductor ribbon such as a gold ribbon can be used.

As shown in FIGS. 3 and 4, the signal input terminals 124a, 124b, 124c, and 124d of the electrical connectors 116a, 116b, 116c, and 116d disposed on the case 114a of the housing 104 are fixed and electrically connected to the other ends of the signal conductor pattern 330a, 330b, 330c, and 330d of the relay substrate 118, respectively. These fixing and electrical connection can be performed by using solder, brazing material, or conductive adhesive, for example.

In particular, in the relay substrate 118 of the optical modulator 100 according to the present embodiment, as shown in FIGS. 4 and 5, input side ground conductor patterns 442a, 442b, 442c, 442d, and 442e are provided on a side surface 418b (referred to as an input side surface 418b) having as one side, the side 418a (hereinafter, referred to as a signal input side 418a) on the side where electrical signals from the signal input terminals 124a, 124b, 124c, and 124d are input to the signal conductor patterns 330a, 330b, 330c, and 330d.

Specifically, the input side ground conductor patterns 442a, 442b, 442c, 442d, and 442e are formed to extend respectively from the ground conductor patterns 340a, 340b, 340c, 340d, and 340e of the front surface of the relay substrate 118 to connect to the ground conductor pattern 542 of the rear surface (or to extend from the ground conductor pattern 542 on the rear surface to connect to the ground conductor patterns 340a, 340b, 340c, 340d, and 340e on the front surface). Further, the input side ground conductor patterns 442a, 442b, 442c, 442d, and 442e are formed with the same width as, for example, the ground conductor patterns 340a, 340b, 340c, 340d, and 340e on the signal input side 418a.

The relay substrate 118 has a rear surface (a surface on which the ground conductor pattern 542 shown in FIG. 5 is formed) fixed to the case 114a, and the ground conductor pattern 542 on the rear surface is electrically connected to the case 114a. In addition, the relay substrate 118 has an input side surface 418b abutting against an inner wall surface 314 (FIG. 3) of the case 114a which is a structure connected to the ground potential, and input side ground conductor patterns 442a, 442b, 442c, 442d, and 442e provided on the input side surface 418b are electrically connected to the inner wall surface 314 of the case 114a that is the structure (see FIGS. 3 and 4). The fixing and electrical connection between the relay substrate 118 and the case 114a can be performed by using solder, brazing material, or conductive adhesive, for example.

In the present embodiment, as shown in FIG. 6, in the relay substrate 118, a conductor is not provided on a side surface 418d (referred to as an output side surface 418d) having as one side, the side 418c (referred to as a signal output side 418c) on the side where an electrical signal is output from the signal conductor patterns 330a, 330b, 330c, and 330d to the signal electrodes 112a, 112b, 112c, and 112d of the optical modulation element 102 (FIG. 6). However, this is only an example, and ground conductor patterns are provided on the output side surface 418d so as to extend from the ground conductor patterns 340a, 340b, 340c, 340d, and 340e on the front surface of the relay substrate 118 and/or the ground conductor pattern 542 of the rear surface.

The optical modulator 100 having the above-described configuration includes the input side ground conductor patterns 442a, 442b, 442c, and 442d, which is extending from the ground conductor patterns 340a, 340b, 340c, 340d, and 340e of the front surface of the relay substrate 118 and is extending from the ground conductor pattern 542 of the rear surface, on the input side surface 418b of the relay substrate 118.

Therefore, the spatial radiation of the electrical signal caused by reflection of the high-frequency electrical signal generated in the vicinity of the signal input side 418a and the leakage of the electrical signal caused by the spatial radiation are effectively suppressed, and the propagation of the high-frequency electrical signal radiated or leaked at the signal input side 418a toward the optical modulation element 102 direction is suppressed.

Further, the extended input side ground conductor pattern 442a can fix the molten solder or brazing material that has exuded into an irregular shape to the side surface of the relay substrate 118 according to the shape of the extended input side ground conductor pattern 442a, by the action of metal reaction or surface tension. Thus, impedance variations due to manufacturing variations can be suppressed, and stable high-frequency electrical signal propagation can be realized.

That is, generally, in a case where a high-frequency electrical signal output from a coaxial connector is input to a coplanar line formed by a conductor pattern on a relay substrate, the high-frequency electrical signal undergoes propagation mode conversion from a coaxial mode to a coplanar mode. Therefore, in the relay substrate, reflection, radiation, and leakage of high-frequency electrical signals are likely to occur in the vicinity of the signal input side. On the other hand, in the optical modulator 100, the ground is strengthened by the input side ground conductor patterns 442a, 442b, 442c, 442d formed on the input side surface 418b with the signal input side 418a as one side, so radiation and leakage of high-frequency electrical signals in the vicinity of the signal input side 418a are suppressed. Further, since the input side ground conductor patterns 442a, 442b, 442c, and 442d act as a shield, it is possible to prevent a high-frequency electrical signal radiated or leaked in the vicinity of the signal input side 418a from propagating inside the relay substrate 118, for example, and reaching the optical modulation element 102.

As a result, in the optical modulator 100, for example, even in a case where the transmission rate becomes higher than 400 Gb/s, the influence of reflection, radiation, and leakage of the electrical signal generated at the relay substrate 118 or its surroundings is effectively reduced, and thus good optical modulation characteristics can be realized.

Next, a modification example of the relay substrate 118 that can be used in the optical modulator 100 according to the first embodiment will be described.

FIRST MODIFICATION EXAMPLE

Figure 7:
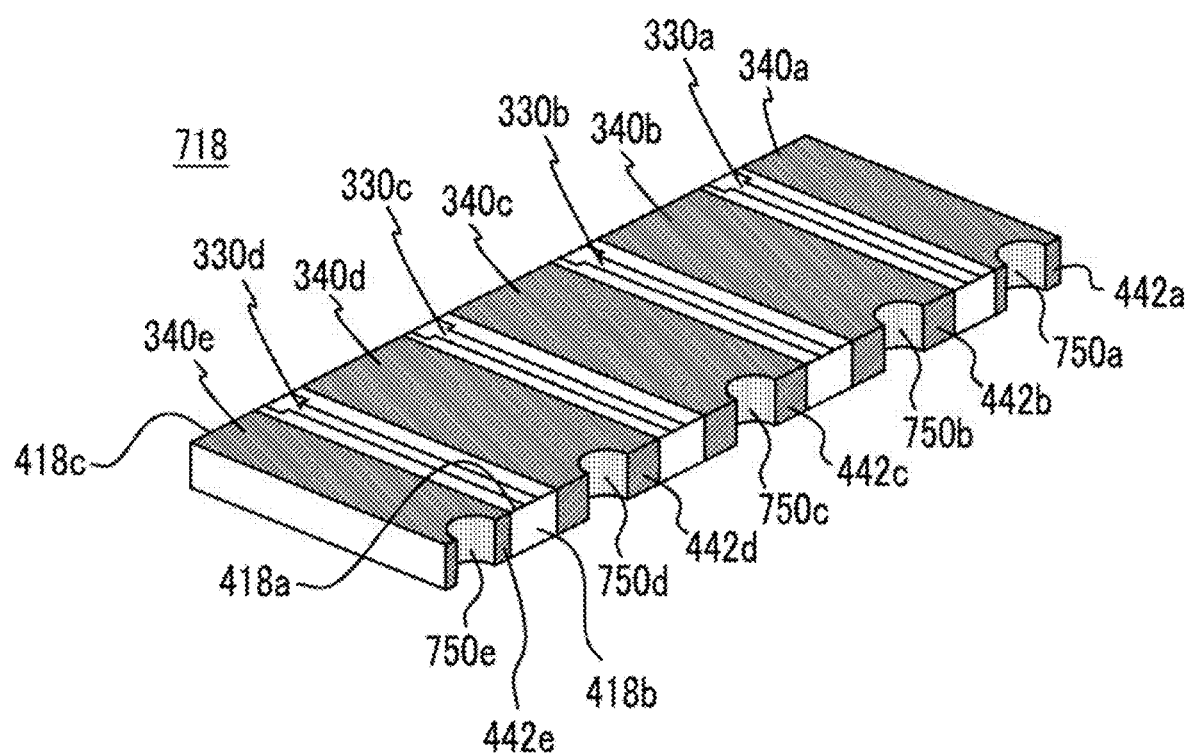
FIG. 7 is a diagram illustrating a first modification example of the relay substrate used in the optical modulator according to the first embodiment.

FIG. 7 is a diagram illustrating a configuration of a relay substrate 718 according to a first modification example. The relay substrate 718 can be used instead of the relay substrate 118 in the optical modulator 100 shown in FIG. 1. In FIG. 7, the same reference numerals as those in FIG. 4 are used for the same components as those of the relay substrate 118 shown in FIG. 4, and the above description of FIG. 4 is adopted. In FIG. 7, only the relay substrate 718 is shown, and the electrical connectors 116a, 116b, 116c, and 116d and the signal input terminals 124a, 124b, 124c, and 124d shown as a reference in FIG. 4 are not shown. In addition, the configuration of the rear surface of the relay substrate 718 is provided with a ground conductor pattern 542, similar to the rear surface of the relay substrate 118 shown in FIG. 5. The configuration of the output side surface 418d of the relay substrate 718 is the same as that of the relay substrate 118 shown in FIG. 6.

The relay substrate 718 shown in FIG. 7 has the same configuration as that of the relay substrate 118 shown in FIG. 4, except that input ground recess portions 750a, 750b, 750c, 750d, and 750e are provided on the input side surface 418b and parts of the input side ground conductor patterns 442a, 442b, 442c, 442d, and 442e are respectively provided in the input ground recess portions 750a, 750b, 750c, 750d, and 750e.

In the present modification example, the input ground recess portions 750a, 750b, 750c, 750d, and 750e extend to the front surface (the surface on which the ground conductor pattern 340a is provided) of the relay substrate 718 and the rear surface that faces the front surface.

In general, in a case where the rear surface of the relay substrate is fixed to the case of the optical modulator with solder or the like, there is a limit in the accuracy of adjusting the amount of solder, and it is difficult to adjust the amount of solder with high accuracy such that the solder does not protrude to the outside of the relay substrate and spreads over the entire surface of the rear surface of the relay substrate.

The relay substrate 718 of the present modification example has input ground recess portions 750a, 750b, 750c, 750d, and 750e in which parts of the input side ground conductor patterns 442a, 442b, 442c, 442d, and 442e are respectively formed, on the input side surface 418b. Therefore, when the ground conductor pattern 542 on the rear surface of the relay substrate 718 is fixed to the case 114a with solder or the like, the solder that protrudes from the rear surface flows into the input ground recess portions 750a, 750b, 750c, 750d, and 750e, and stays inside the input ground recess portion 750a.

Therefore, in the relay substrate 718, the optical modulator 100 can be stably manufactured with good reproducibility such that the solder fixed state with the case 114a on the rear surface of the relay substrate 718, in other words, the electrical connection state is good. Further, there are the input ground recess portions 750a, 750b, 750c, 750d, and 750e, and even in a case where the solder protrudes from the rear surface, the protruding solder stays inside the input ground recess portion 750a. Thus, the conductivity between the ground conductor patterns on the front and rear surfaces is increased, so the ground in the vicinity of the signal input side 418a can be strengthened more effectively than the relay substrate 118. As a result, in the relay substrate 718, the influence of reflection, radiation, and leakage of the high-frequency electrical signal is more effectively reduced than the relay substrate 118, and it is possible to prevent the radiated or leaked high-frequency electrical signal from passing through the inside of the relay substrate 718 and propagating toward the optical modulation element 102.

In addition to the case where the relay substrate 718 and the case 114a are fixed by solder, the above-described effects can also be similarly achieved in a case of using a brazing material or a conductive adhesive.

Further, in the present modification example, as in the case of the relay substrate 118 described above, the extended input side ground conductor pattern 442a can fix the molten solder or brazing material that has exuded into an irregular shape to the side surface of the relay substrate 718 according to the shape of the extended input side ground conductor pattern 442a, by the action of metal reaction or surface tension. Thus, impedance variations due to manufacturing variations can be suppressed, and stable high-frequency electrical signal propagation can be realized.

SECOND MODIFICATION EXAMPLE

Figure 8:
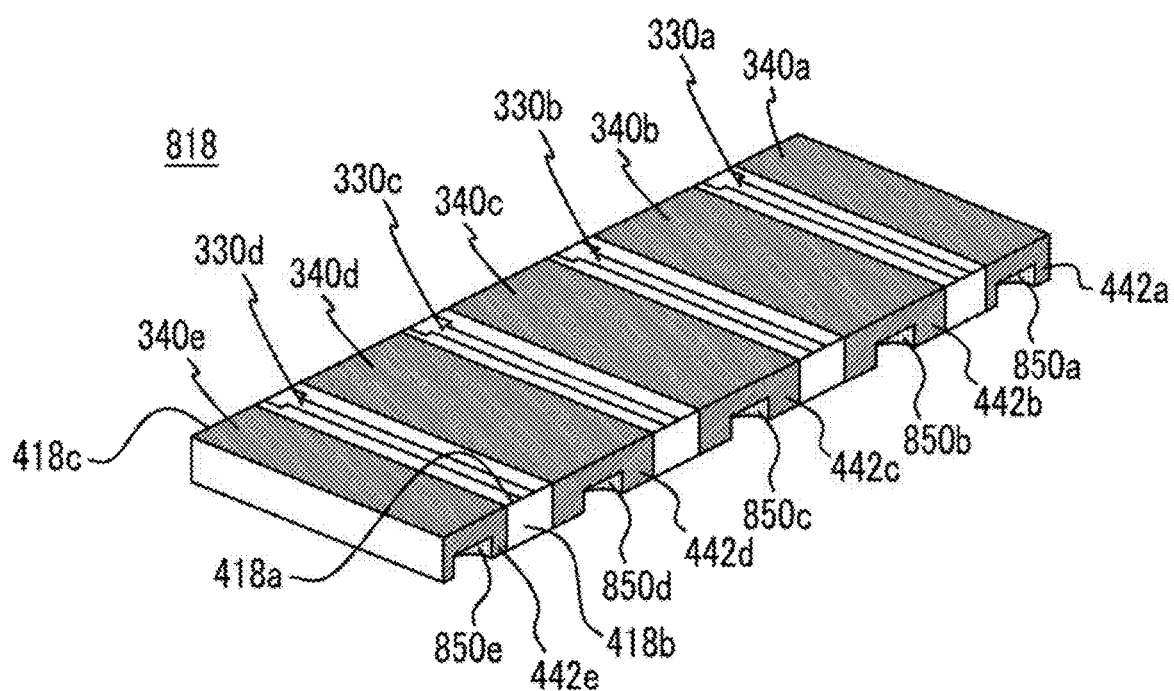
FIG. 8 is a diagram illustrating a second modification example of the relay substrate used in the optical modulator according to the first embodiment.

FIG. 8 is a diagram illustrating a configuration of a relay substrate 818 according to a second modification example. The relay substrate 818 can be used instead of the relay substrate 118 in the optical modulator 100 shown in FIG. 1.

In FIG. 8, the same reference numerals as those in FIG. 4 are used for the same components as those of the relay substrate 118 shown in FIG. 4, and the above description of FIG. 4 is adopted. In FIG. 8, only the relay substrate 818 is shown, and the electrical connectors 116a, 116b, 116c, and 116d and the signal input terminals 124a, 124b, 124c, and 124d shown as a reference in FIG. 4 are not shown. In addition, the configuration of the rear surface of the relay substrate 818 is provided with a ground conductor pattern 542, similar to the rear surface of the relay substrate 118 shown in FIG. 5. The configuration of the output side surface 418d of the relay substrate 818 is the same as that of the relay substrate 118 shown in FIG. 6.

The relay substrate 818 shown in FIG. 8 has the same configuration as that of the relay substrate 118 shown in FIG. 4, except that input ground recess portions 850a, 850b, 850c, 850d, and 850e are provided on the input side surface 418b. Further, the input ground recess portions 850a, 850b, 850c, 850d, and 850e have the same configuration as the input ground recess portion 750a and the like of the relay substrate 718 shown in FIG. 7, but is different from the input ground recess portion 750a in that it extends to the middle of the thickness of the relay substrate 818 from the rear surface facing the front surface of the relay substrate 818 (the surface on which the ground conductor pattern 340a is provided) and does not extend to the front surface.

Parts of the input side ground conductor patterns 442a, 442b, 442c, and 442d are provided in the input ground recess portions 850a, 850b, 850c, 850d, and 850e, respectively.

Similar to the relay substrate 718 according to the first modification example, in the relay substrate 818 having the above-described configuration, when the ground conductor pattern 542 on the rear surface of the relay substrate 818 is fixed to the case 114a with solder or the like, the solder that protrudes from the rear surface flows into the input ground recess portions 850a, 850b, 850c, 850d, and 850e, and stays inside the input ground recess portion 850a.

Therefore, in the relay substrate 818, as in the relay substrate 718, the optical modulator 100 can be stably manufactured with good reproducibility such that the solder fixed state with the case 114a on the rear surface of the relay substrate 818, accordingly, the electrical connection state is good. For example, in a case where the amount of solder that protrudes is smaller compared to the configuration of FIG. 7, the above-described effects can be achieved by the input ground recess portions 850a, 850b, 850c, 850d, and 850e extending to the middle in the thickness direction, as the relay substrate 818.

In the relay substrate 818, as in the relay substrate 718, there are the input ground recess portions 850a, 850b, 850c, 850d, and 850e, and the protruding solder stays inside the input ground recess portion 850a, so the ground in the vicinity of the signal input side 418a can be strengthened more effectively than the relay substrate 118 in FIG. 4. As a result, in the relay substrate 818, the influence of reflection, radiation, and leakage of the high-frequency electrical signal is more effectively reduced than the relay substrate 118 in FIG. 4, and it is possible to prevent the radiated or leaked high-frequency electrical signal from passing through the inside of the relay substrate 818 and propagating toward the optical modulation element 102.

As in the case of the first modification example, in addition to the case where the relay substrate 818 and the case 114a are fixed by solder, the above-described effects can also be similarly achieved in a case of using a brazing material or a conductive adhesive.

Further, in the present modification example, as in the case of the relay substrate 118 described above, the extended input side ground conductor pattern 442a can fix the molten solder or brazing material that has exuded into an irregular shape to the side surface of the relay substrate 818 according to the shape of the extended input side ground conductor pattern 442a, by the action of metal reaction or surface tension. Thus, impedance variations due to manufacturing variations can be suppressed, and stable high-frequency electrical signal propagation can be realized.

THIRD MODIFICATION EXAMPLE

Figure 9:
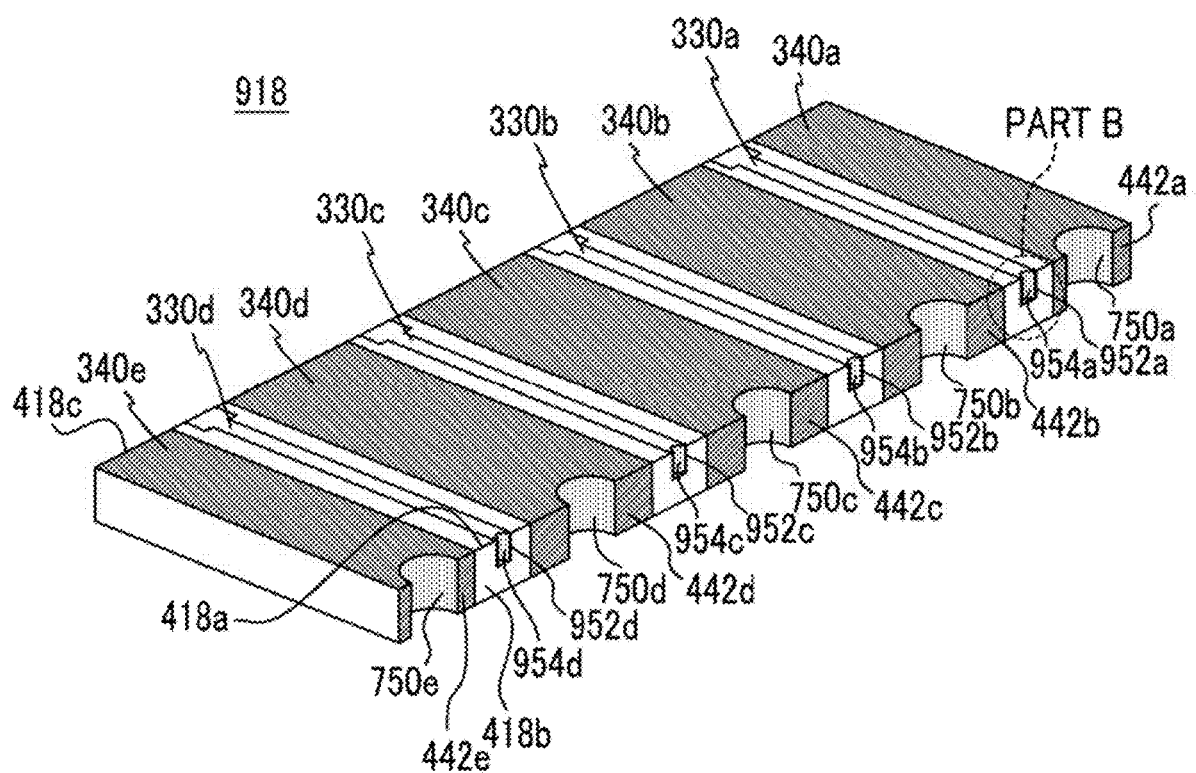
FIG. 9 is a diagram illustrating a third modification example of the relay substrate used in the optical modulator according to the first embodiment.

FIG. 9 is a diagram illustrating a configuration of a relay substrate 918 according to a third modification example. The relay substrate 918 can be used instead of the relay substrate 118 in the optical modulator 100 shown in FIG. 1, similarly to the relay substrate 718 shown in FIG. 7. In FIG. 9, the same reference numerals as those in FIG. 7 are used for the same components as those of the relay substrate 718 shown in FIG. 7, and the above description of FIG. 7 is adopted. In addition, the configuration of the rear surface of the relay substrate 918 is provided with a ground conductor pattern 542, similar to the rear surface of the relay substrate 118 shown in FIG. 5. The configuration of the output side surface 418d of the relay substrate 918 is the same as that of the relay substrate 118 shown in FIG. 6.

The relay substrate 918 shown in FIG. 9 has the same configuration as the relay substrate 718 shown in FIG. 7 except that side signal conductor patterns 952a, 952b, 952c, and 952d respectively extending from the signal conductor patterns 330a, 330b, 330c, and 330d on the front surface are provided in the input side surface 418b. The relay substrate 918 is different from the relay substrate 718 in that the input side surface 418b is provided with signal recess portions 954a, 954b, 954c, and 954d that extend from the front surface and do not extend to the rear surface.

In the modification example, the side signal conductor patterns 952a, 952b, 952c, and 952d have substantially the same widths as the widths of the signal conductor patterns 330a, 330b, 330c, and 330d in the signal input side 418a. Parts of the side signal conductor patterns 952a, 952b, 952c, and 952d are provided on the inner surface of the signal recess portions 954a, 954b, 954c, and 954d, respectively.

Figure 10:
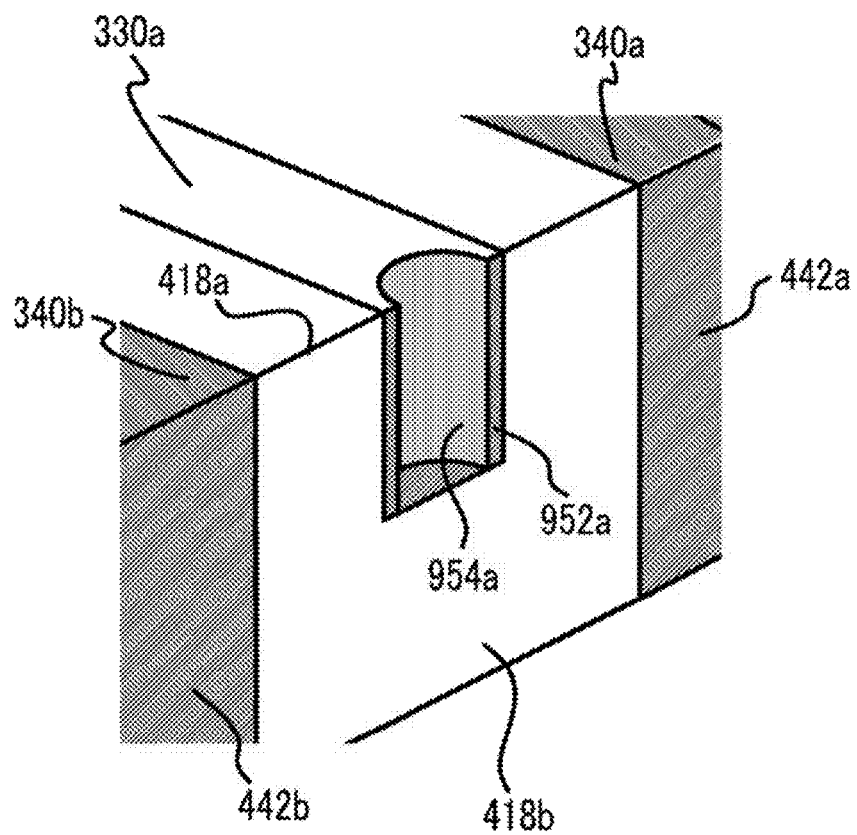
FIG. 10 is a detailed view of part B of the relay substrate shown in FIG. 9.

FIG. 10 is a partial detail view of a part C in FIG. 9, and shows the relationship among the signal conductor pattern 330a, the side signal conductor pattern 952a, and the signal recess portion 954a. The side signal conductor pattern 952a has the same width as that of the signal conductor pattern 330a on the signal input side 418a, and a part of the side signal conductor pattern 952a is provided on the inner surface of the signal recess portion 954a. The relationship among the other signal conductor patterns 330b, 330c, and 330d, the side signal conductor patterns 952b, 952c, and 952d, and the signal recess portions 954b, 954c, and 954d is the same as the relationship among the signal conductor pattern 330a, the side signal conductor pattern 952a, and the signal recess portion 954a shown in FIG. 10.

Since the relay substrate 918 having the above configuration includes the input ground recess portions 750a, 750b, 750c, 750d, and 750e, as in the relay substrate 718 according to the first modification example, the optical modulator 100 can be stably manufactured with good reproducibility such that the electrical connection state with the case 114a on the rear surface of the relay substrate 918 is good. For the same reason, in the relay substrate 918, similarly to the relay substrate 718, the ground in the vicinity of the signal input side 418a is strengthened more effectively than the relay substrate 118, the reflection, radiation, and leakage of the high-frequency electrical signal is suppressed, and it is possible to prevent the radiated or leaked high-frequency electrical signal from passing through the inside of the relay substrate 918 and propagating toward the optical modulation element 102.

Further, on the relay substrate 918, side signal conductor patterns 952a, 952b, 952c, and 952d extending from the signal conductor patterns 330a, 330b, 330c, and 330d on the front surface are provided on the input side surface 418b, and, parts thereof are provided in the signal recess portions 954a, 954b, 954c, and 954d that extend from the front surface and do not extend to the rear surface.

Therefore, in the relay substrate 918, in a case where the signal input terminals 124a, 124b, 124c, and 124d and the signal conductor patterns 330a, 330b, 330c, and 330d are respectively connected by, for example, solder, even in a case where the amount of solder varies, the excess solder is transferred to the side signal conductor patterns 952a, 952b, 952c, and 952d and stays in the signal recess portions 954a, 954b, 954c, and 954d. Accordingly, in the relay substrate 918, the respective connection portions between the signal input terminals 124a, 124b, 124c, and 124d and the signal conductor patterns 330a, 330b, 330c, and 330d can be in a more appropriate solder connection state than the case where there is no signal recess portion, and the connection at each connection portion is uniformly performed. As a result, variation in impedance between the connection portions is suppressed, and good optical modulation characteristics can be stably secured.

Further, in the present modification example, as in the case of the relay substrate 118 described above, the extended input side ground conductor pattern 442a can fix the molten solder or brazing material that has exuded into an irregular shape to the side surface of the relay substrate 918 according to the shape of the extended input side ground conductor pattern 442a, by the action of metal reaction or surface tension. Thus, impedance variations due to manufacturing variations can be suppressed, and stable high-frequency electrical signal propagation can be realized.

FOURTH MODIFICATION EXAMPLE

Figure 11:
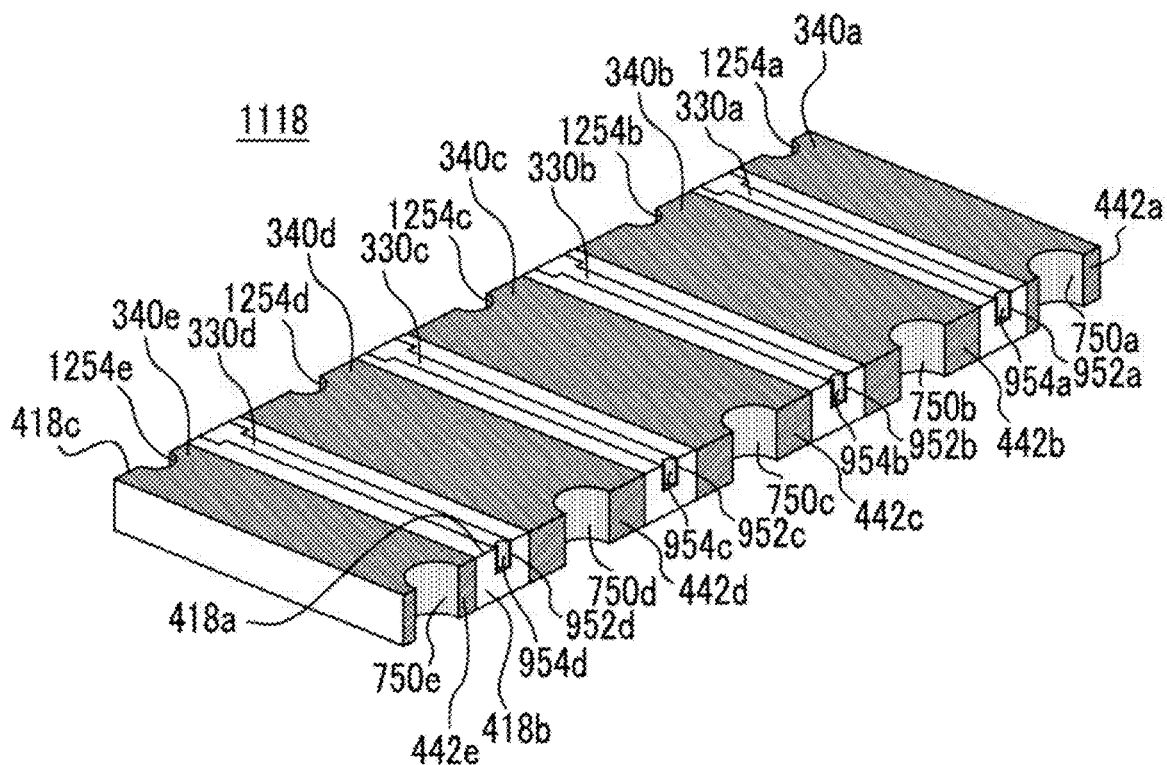
FIG. 11 is a perspective view of a front surface of a relay substrate according to a fourth modification example used in the optical modulator according to the first embodiment as viewed from a side where signal input terminals are disposed.
Figure 12:
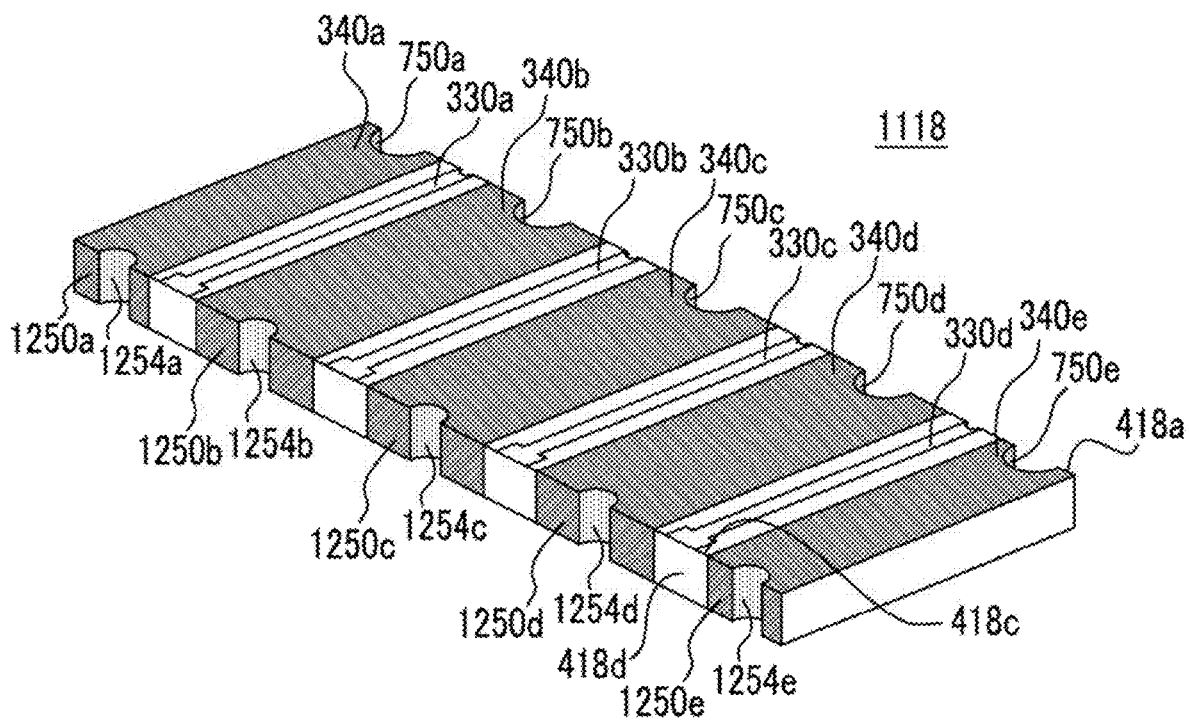
FIG. 12 is a perspective view of a front surface of the relay substrate according to the fourth modification example used in the optical modulator according to the first embodiment as viewed from a side where the optical modulation element is disposed.

FIGS. 11 and 12 are diagrams illustrating the configuration of a relay substrate 1118 according to a fourth modification example. The relay substrate 1118 can be used instead of the relay substrate 118 in the optical modulator 100 shown in FIG. 1, similarly to the relay substrate 918 shown in FIG. 9. Here, FIG. 11 is a perspective view of a front surface of a single relay substrate 1118 as viewed from the side where the signal input terminal 124a is disposed, and FIG. 12 is a perspective view of a front surface of the single relay substrate 1118 viewed from the side where the optical modulation element 102 is disposed.

In FIG. 11, the same reference numerals as those in FIG. 9 are used for the same components as those of the relay substrate 918 shown in FIG. 9, and the above description of FIG. 9 is adopted. In addition, the configuration of the rear surface of the relay substrate 1118 is provided with a ground conductor pattern 542, similar to the rear surface of the relay substrate 118 shown in FIG. 5.

The relay substrate 1118 shown in FIGS. 11 and 12 has the same configuration as that of the relay substrate 918 shown in FIG. 9, except that as shown in FIG. 12, output side ground conductor patterns 1250a, 1250b, 1250c, 1250d, and 1250e respectively extending from the ground conductor patterns 340a, 340b, 340c, 340d, and 340e on the front surface are provided in the output side surface 418d. The relay substrate 1118 is different from the relay substrate 918 in that the output side surface 418d is provided with output ground recess portions 1254a, 1254b, 1254c, 1254d, and 1254e that extend from the front surface to the rear surface.

In the present modification example, the output side ground conductor patterns 1250a, 1250b, 1250c, 1250d, and 1250e have the same widths as the widths of the ground conductor patterns 340a, 340b, 340c, 340d, and 340e on the signal output side 418c, respectively. Parts of the output side ground conductor patterns 1250a, 1250b, 1250c, 1250d, and 1250e are provided on the inner surfaces of the output ground recess portion 1254a, 1254b, 1254c, 1254d, and 1254e, respectively.

Since the relay substrate 1118 having the above configuration has the same configuration as the relay substrate 918 shown in FIG. 9 of the third modification example, the same effect as the relay substrate 918 described above is achieved. In addition to this, in the relay substrate 1118, in a case where the amount of solder used for fixing the relay substrate 1118 to the case 114a is large, for example, the solder protruding from the relay substrate 1118 flow into the output side ground conductor patterns 1250a, 1250b, 1250c, 1250d, and 1250e inside the output ground recess portions 1254a, 1254b, 1254c, 1254d, and 1254e, and stays in the output ground recess portions 1254a, 1254b, 1254c, 1254d, and 1254e, the accuracy required for adjusting the amount of solder is greatly relaxed.

Further, since the solder protrudes into the ground recess portions on both the signal input side 418a and the signal output side 418c, the symmetry of the amount of protruding solder is improved. Accordingly, uneven distribution of stress due to solidification of solder in the relay substrate 1118 can be reduced, and reliability can be improved by reducing peeling and cracking of the relay substrate 1118.

Further, since there are output side ground conductor patterns 1250a, 1250b, 1250c, 1250d, and 1250e, and the protruding solder stay in the output ground recess portions 1254a, 1254b, 1254c, 1254d, and 1254e, as compared with the relay substrate 118, it is possible to suppress the high-frequency electrical signal radiated or leaked from the vicinity of the signal input side 418a from reaching the optical modulation element 102 more effectively.

Here, on the relay substrate 1118, like the relay substrate 118, the signal conductor patterns 330a, 330b, 330c, and 330d constitute coplanar lines together with the ground conductor patterns 340a, 340b, 340c, 340d, and 340e, respectively. Therefore, in the signal input side 418a where the signal input terminal 124a and the like are disposed, the high-frequency electrical signals input from the signal input terminal 124a and the like undergoes propagation mode conversion from the coaxial mode to the coplanar mode. In the signal output side 418c where an electrical signal is output to the optical modulation element 102, the coplanar mode high-frequency electrical signals propagated in the relay substrate 1118 are output to the signal electrodes 112a, 112b, 112c, and 112d constituting a coplanar line on the optical modulation element 102, without undergoing mode conversion.

Therefore, reflection, radiation, and leakage of the high-frequency electrical signal is less likely to occur in the signal output side 418c than the signal input side 418a, and the width of the output ground recess portion 1254a provided on the output side surface 418d can be reduced as compared with the input ground recess portion 750a provided on the input side surface 418b.

In the present modification example, the output ground recess portion 1254a provided on the output side surface 418d are formed to be approximately half as narrow as the input ground recess portion 750a provided on the input side surface 418b.

Further, in the present modification example, as in the case of the relay substrate 118 described above, the extended input side ground conductor pattern 442a can fix the molten solder or brazing material that has exuded into an irregular shape to the side surface of the relay substrate 1118 according to the shape of the extended input side ground conductor pattern 442a, by the action of metal reaction or surface tension. Thus, impedance variations due to manufacturing variations can be suppressed, and stable high-frequency electrical signal propagation can be realized.

Second Embodiment

Figure 13:
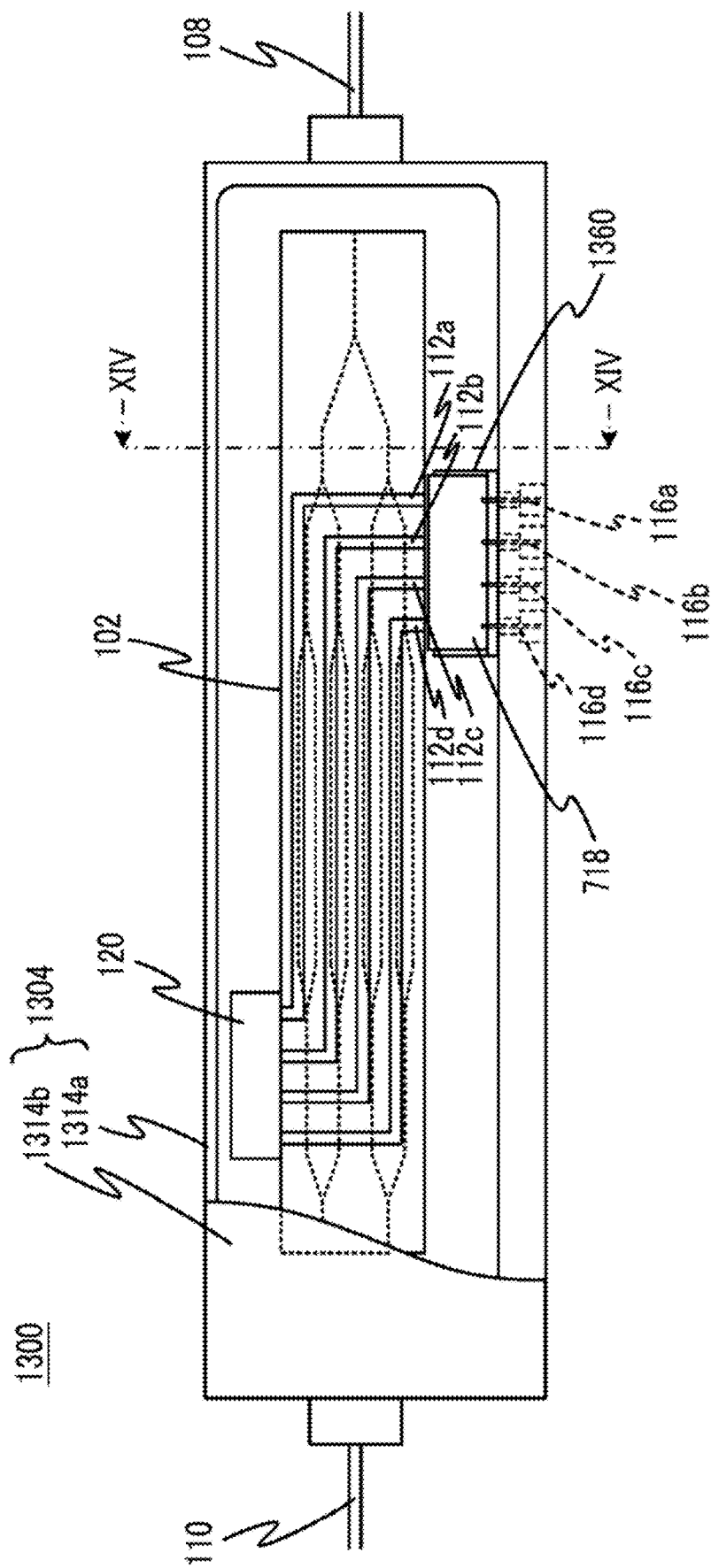
FIG. 13 is a plan view of an optical modulator according to a second embodiment of the present invention.

Next, an optical modulator according to a second embodiment of the present invention will be described. FIG. 13 is a diagram illustrating a configuration of an optical modulator 1300 according to the present embodiment. In FIG. 13, the same reference numerals as those in FIG. 1 are used for the same components as those of the optical modulator 100 according to the first embodiment, and the description of FIG. 1 is adopted.

The present optical modulator 1300 has the same configuration as the optical modulator 100, but includes a relay substrate 718 instead of the relay substrate 118, and the relay substrate 718 is fixed to and electrically connected to the case 114a of the housing 104 through a support 1360 that is a separate structure from the housing 104. Here, in the optical modulator 1300, the relay substrate 718 is used as the relay substrate for the sake of illustration only, and the relay substrate 118, 818, 918, or 1118 may be used instead of the relay substrate 718.

The optical modulator 1300 includes a housing 1304 configured with a case 1314a and a cover 1314b, instead of the housing 104 configured with the case 114a and the cover 114b. Even though the case 1314a has the same configuration as the case 114a, the case 1314a is different from the case 114a in that it has a slightly larger width than the case 114a in order to secure a space for housing the support 1360, but it can have the same width as the case 114a by adjusting the design of the optical element and housing.

As in the case of the optical modulator 100, the connection between the signal conductor pattern 330a of the relay substrate 718 and the signal input terminal 124a in the optical modulator 1300 can be performed by, for example, solder, brazing material, conductive adhesive, or the like. Further, in the optical modulator 1300, the connection between the signal conductor pattern 330a and the ground conductor pattern 340a of the relay substrate 718 and the signal electrode 112a and the ground electrode 122a of the optical modulation element 102, as in the case of the optical modulator 100, may be performed by wire bonding using the conductor wire 126, for example.

Figure 14:
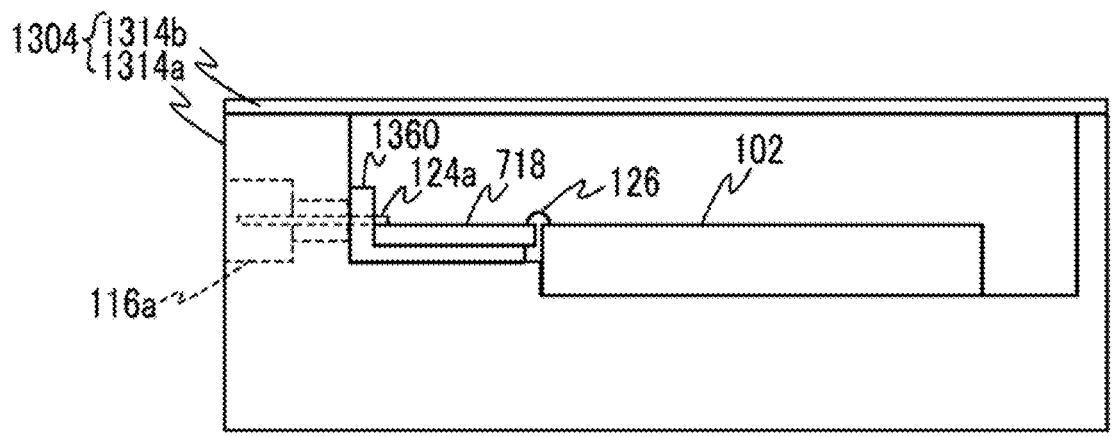
FIG. 14 is a cross-sectional view taken along XIV of the optical modulator shown in FIG. 13.

FIG. 14 is a cross-sectional view taken along the XIV line in FIG. 13. The relay substrate 718 has a rear surface (more specifically, a ground conductor pattern 542 provided on the rear surface) fixed and electrically connected to the inside of the case 1314a through the support 1360.

Figure 15:
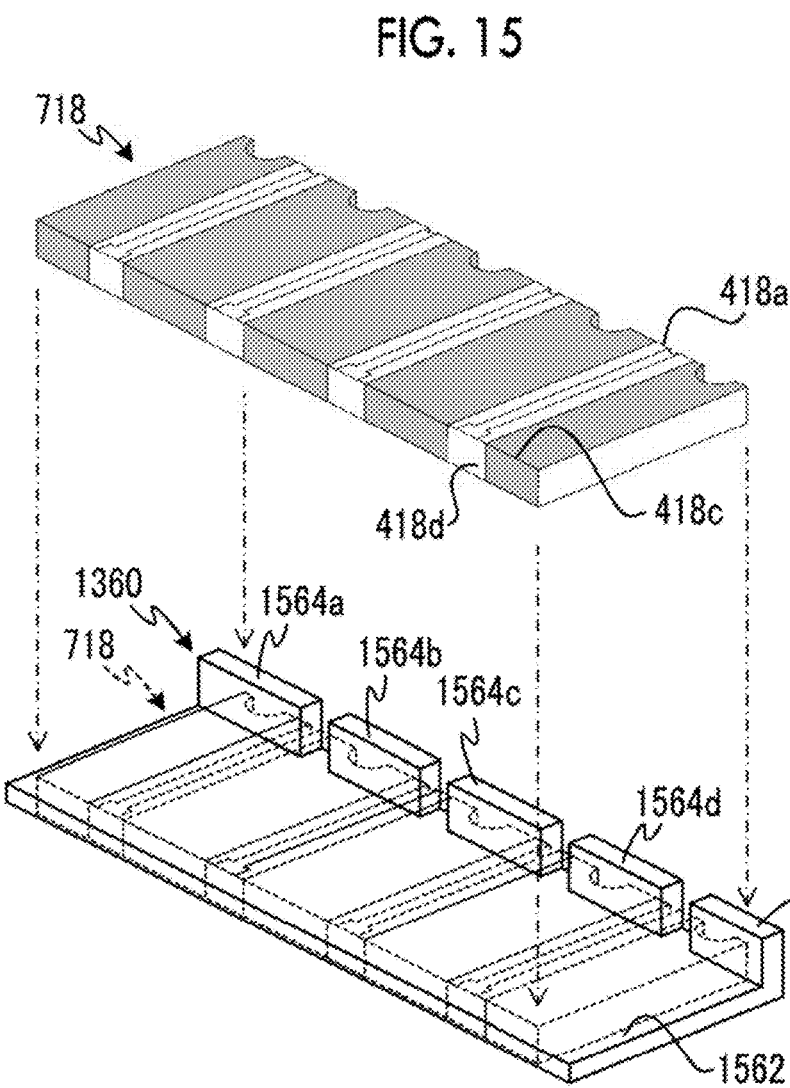
FIG. 15 is a diagram showing a configuration of a support used in the optical modulator shown in FIG. 13, and a positional relationship between the relay substrate fixed to the support and the support.

FIG. 15 is a diagram showing the configuration of the support 1360, and the positional relationship between the relay substrate 718 fixed to the support 1360 and the support 1360. The support 1360 includes a pedestal part 1562 to which the rear surface of the relay substrate 718 is fixed, and protuberances 1564a, 1564b, 1564c, 1564d, and 1564e provided along one side extending in the longitudinal direction of the pedestal part 1562. The relay substrate 718 is disposed at a position indicated by a dotted line on the support 1360 and is fixed and electrically connected (hereinafter simply referred to as "fix" or "fixed"). At this time, in particular, the input side surface 418b of the relay substrate 718 (the surface facing the output side surface 418d shown in FIG. 15) is in contact with the protuberance 1564a of the support 1360, and the input side ground conductor pattern 442a provided on the input side surface 418b is electrically connected to the protuberance 1564a.

The protuberances 1564a, 1564b, 1564c, 1564d, and 1564e are provided at a predetermined interval, and constitute four slits between each other. As a preferred example in the present exemplary embodiment, the interval between the four slits is set to the same distance as the interval of the signal conductor pattern 330a and the like of the relay substrate 718, but at least one of the four slit intervals may be different. On the relay substrate 718, the signal conductor pattern 330a and the like are connected to the signal input terminal 124a and the like disposed in the case 1314a through these slits.

For example, the relay substrate 718 is fixed on the support 1360 and then fixed in the case 1314a. The support 1360 is made of, for example, metal, and constitutes a structure that is connected to the ground potential through the case 1314a.

In general, the relay substrate used in the optical modulator is likely to be made of ceramic. On the other hand, the housing of the optical modulator is made of a material different from the ceramic, such as KOVAR. Therefore, in a case where the environmental temperature fluctuates, due to the difference in linear expansion coefficient between the materials of the housing and the relay substrate, stress is repeatedly generated at the connection portion between the relay substrate and the housing, and problems such as cracking and peeling at the connection portion may occur.

Since the optical modulator 1300 having the above configuration fixes the relay substrate 718 to the case 1314a through the support 1360 that is separate from the case 1314a of the housing 104, by appropriately selecting the material used as the support 1360, generation of problems such as cracking and peeling can be effectively avoided and long-term reliability can be improved. Further, since the material of the support 1360 can be selected as described above, the degree of freedom regarding the material selection and the structural design of the relay substrate 718 and the case 1314a can be improved.

Further, as compared to fixing the relay substrate directly to the case with brazing material, by fixing the relay substrate to a separate support in advance, it is easier to manage the heat uniformity and heat conduction during brazing material melting and fixing more accurately and the brazing material can be fixed with higher accuracy.

Further, in the present modification example, as in the case of the relay substrate 118 described above, the extended input side ground conductor pattern 442a can fix the molten solder or brazing material that has exuded into an irregular shape to the side surface of the relay substrate 718 according to the shape of the extended input side ground conductor pattern 442a, by the action of metal reaction or surface tension. Thus, impedance variations due to manufacturing variations can be suppressed, and stable high-frequency electrical signal propagation can be realized.

Figure 16:
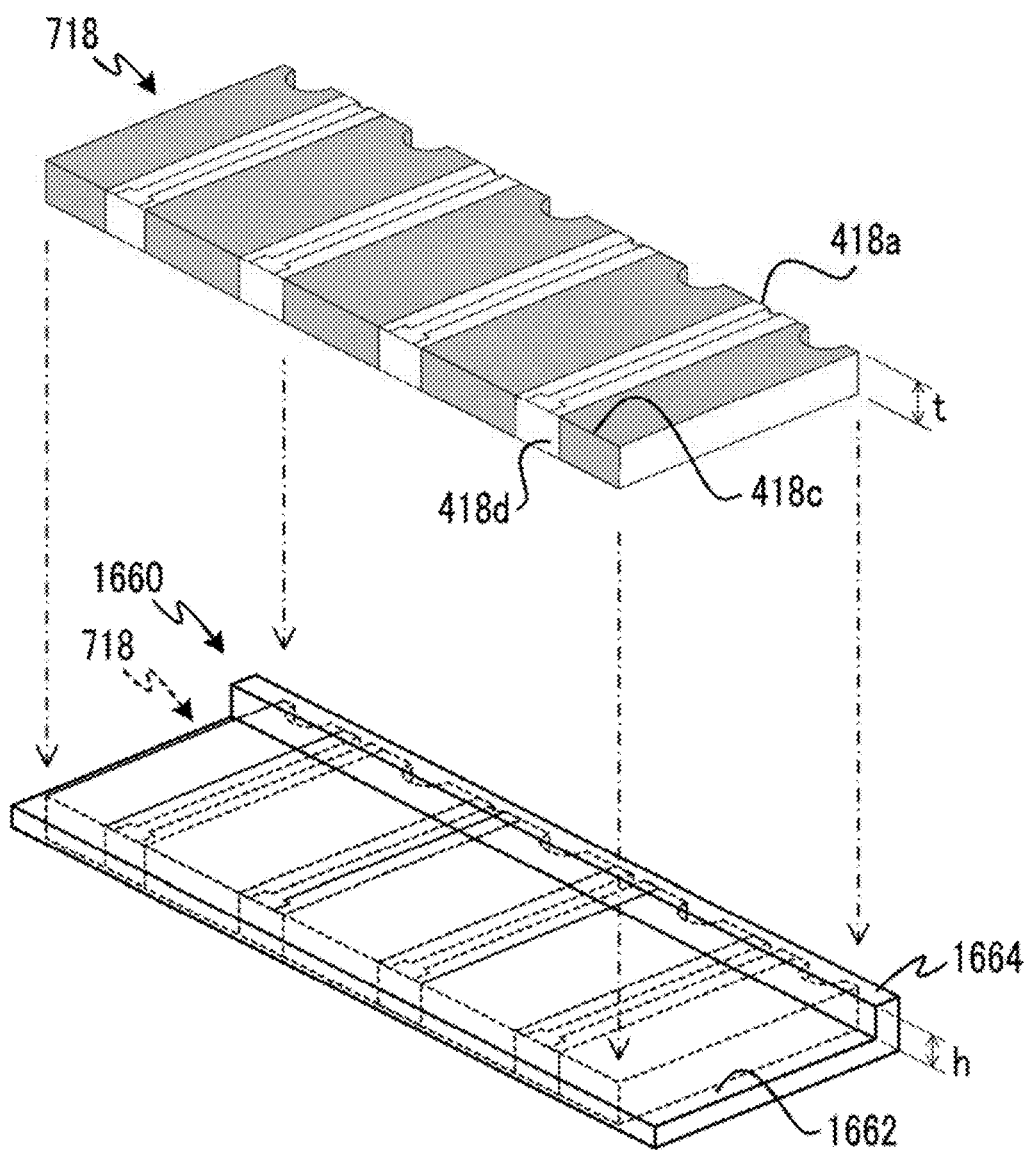
FIG. 16 is a diagram showing a modification example of the support used in the optical modulator shown in FIG. 13.

As a modification example of the support 1360, a simple support 1660 as shown in FIG. 16 can be used in the optical modulator 1300. Unlike the support 1360, the support 1660 shown in FIG. 16 includes a pedestal part 1662 and one protuberance 1664 extending along one edge of the pedestal part 1662, without having a slit. For example, the relay substrate 718 is fixed to the pedestal part 1662 of the support 1660 and then fixed to the case 1314a. The height h of the protuberance 1664 from the upper surface of the pedestal part 1662 is configured to be smaller than at least the thickness t of the relay substrate 718 such that the signal input terminal 124a is not in contact with the protuberance 1664 when the signal conductor pattern 330a and the signal input terminal 124a of the relay substrate 718 are connected.

On the other hand, from the viewpoint of strengthening the ground on the input side surface 418b of the relay substrate 718 and blocking the radiated high-frequency electrical signal, it is desirable to secure the contact area between the input side surface 418b of the relay substrate 718 and the protuberance 1664 as wide as possible. Therefore, it is desirable that the height h of the protuberance 1664 is larger than ½ of the thickness t of the relay substrate 718 (h>½), for example.

Third Embodiment

Next, a third embodiment of the present invention will be described. The present embodiment is an optical transmission apparatus mounted with an optical modulator related to either of the optical modulator 100 according to the first embodiment, the optical modulator 100 including the relay substrates 718, 818, 918, and 1118 according to the first to fourth modification examples of the first embodiment, or the optical modulator 1300 according to the second embodiment.

Figure 17:
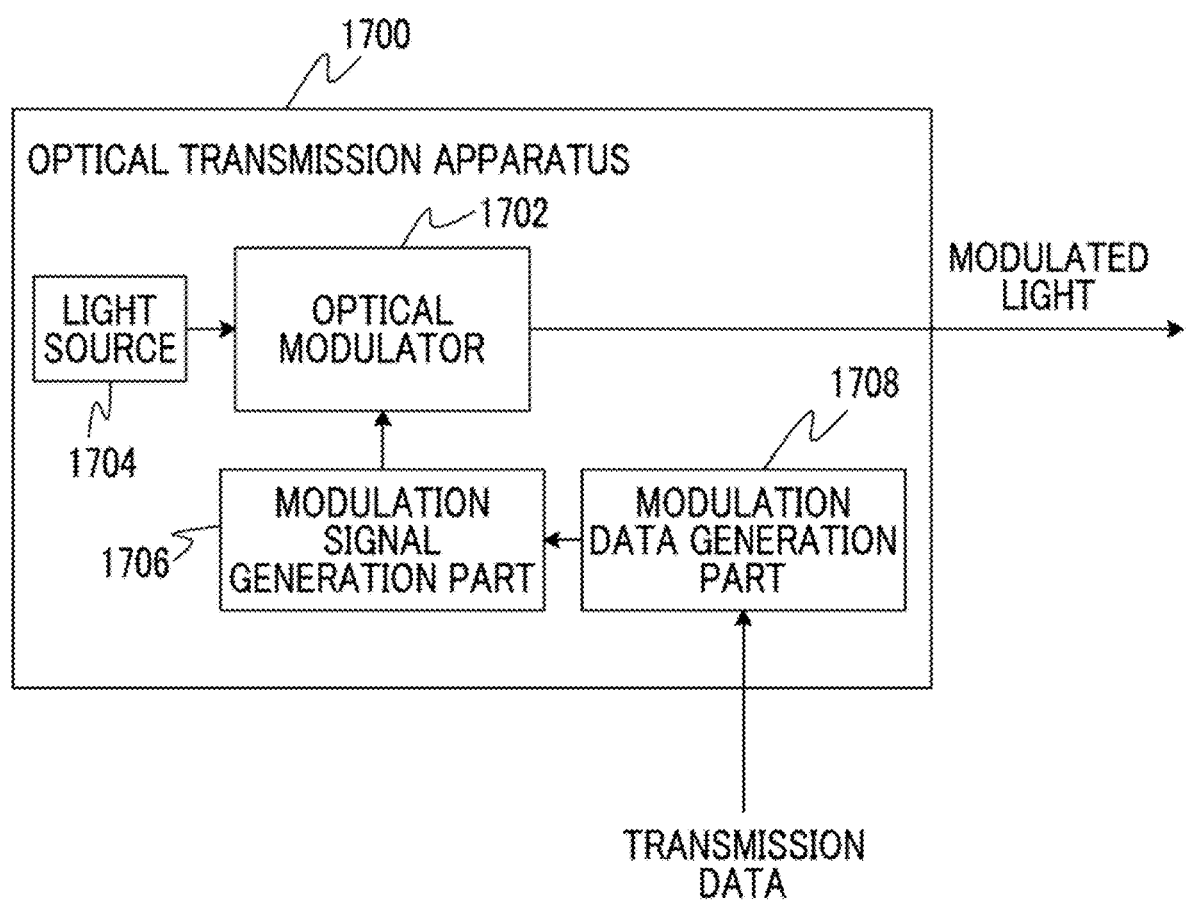
FIG. 17 is a diagram illustrating a configuration of an optical transmission apparatus according to a third embodiment of the present invention.

FIG. 17 is a diagram illustrating a configuration of an optical transmission apparatus according to the present embodiment. The present optical transmission apparatus 1700 includes an optical modulator 1702, a light source 1704 that inputs light to the optical modulator 1702, a modulation signal generation part 1706, and a modulation data generation part 1708.

The optical modulator 1702 may be an optical modulator related to either of the optical modulator 100 according to the first embodiment, the optical modulators 100 including the relay substrates 718, 818, 918, and 1118 according to the first to fourth modification examples of the first embodiment, or the optical modulator 1300 according to the second embodiment.

The modulation data generation part 1708 receives transmission data given from the outside, generates modulation data for transmitting the transmission data (for example, data obtained by converting or processing transmission data into a predetermined data format), and outputs the generated modulation data to the modulation signal generation part 1706.

The modulation signal generation part 1706 is an electronic circuit (drive circuit) that outputs an electrical signal for causing the optical modulator 1702 to perform a modulation operation, generates a modulation signal which is a high-frequency signal for making the optical modulator 1702 perform an optical modulation operation according to the modulation data, based on the modulation data which is output by the modulation data generation part 1708, and inputs the generated modulation signal to the optical modulator 1702. The modulation signal includes four high-frequency electrical signals corresponding to the four signal electrodes 112a, 112b, 112c, and 112d of the optical modulation element 102 provided in the optical modulator 100 that is the optical modulator 1702.

The four high-frequency electrical signals are input from the signal input terminals 124*a*, 124*b*, 124*c*, and 124*d* of the electrical connectors 116*a*, 116*b*, 116*c*, and 116*d* of the optical modulator 100 which is the optical modulator 1702 to the signal conductor patterns 330*a*, 330*b*, 330*c*, and 330*d* on the relay substrate 118, and are input to the signal electrodes 112*a*, 112*b*, 112*c*, and 112*d* of the optical modulation element 102 through the signal conductor pattern 330*a*.

Thus, the light output from the light source 1704 is, for example, DP-QPSK modulated by the optical modulator 1702 and output as modulated light from the optical transmission apparatus 1700.

In particular, in the present optical transmission apparatus 1700, as the optical modulator 1702, an optical modulator related to either of the optical modulator 100 according to the first embodiment, the optical modulator 100 including the relay substrates 718, 818, 918, and 1118 according to the first to fourth modification examples of the first embodiment, or the optical modulator 1300 according to the second embodiment is used, stable and good optical modulation feature can be ensured, and therefore stable and good transmission characteristics can be realized.

The present invention is not limited to the configurations of the above-described embodiments, and can be realized in various aspects without departing from the spirit thereof.

For example, in the above-described embodiment, in the relay substrate 118 or the like, the input side ground conductor patterns 442*a*, 442*b*, 442*c*, 442*d*, and 442*e* respectively extending from the ground conductor patterns 340*a*, 340*b*, 340*c*, 340*d*, and 340*e* formed on the front surface to the ground conductor patterns on the rear surface are provided on the input side surface 418*b*, but the present invention is not limited to this. At least one of the input side ground conductor patterns 442*a*, 442*b*, 442*c*, 442*d*, and 442*e* may be formed so as to extend from at least one of the ground conductor patterns 340*a*, 340*b*, 340*c*, 340*d*, and 340*e* within a range required from the viewpoint of ground strengthening at the signal input side 418*a* of the relay substrate 118 and the like. Alternatively, in the range required from the above viewpoint, the input side surface 418*b* maybe formed with at least one of the input side ground conductor patterns 442*a*, 442*b*, 442*c*, 442*d*, and 442*e* which extend only from the ground conductor pattern 542 on the rear surface of the relay substrate 118, for example, and does not extend to the signal input side 418*a*.

Similarly, in the relay substrate 1118 in the above-described embodiment, at least corresponding one among the output side ground conductor patterns 1250*a*, 1250*b*, 1250*c*, 1250*d*, and 1250*e* may be formed on the output side surface 418*d* so as to extend from at least one of the ground conductor patterns 340*a*, 340*b*, 340*c*, 340*d*, and 340*e*, within a range required from the viewpoint of ground strengthening at the signal output side 418*c*. Alternatively, in the range required from the above viewpoint, the output side surface 418*d* may be formed with at least one of the output side ground conductor patterns 1250*a*, 1250*b*, 1250*c*, 1250*d*, and 1250*e* so as to extend only from the ground conductor pattern 542 on the rear surface of the relay substrate 1118, for example, and not to extend to the signal output side 418*c*.

Similarly, in the relay substrate 1118 in the above-described embodiment, within a range required from the viewpoint of ground strengthening at the signal output side 418*c*, the width of each of the output side ground conductor patterns 1250*a*, 1250*b*, 1250*c*, 1250*d*, and 1250*e* may be narrower than the widths of the ground conductor patterns 340*a*, 340*b*, 340*c*, 340*d*, and 340*e* at the signal output side 418*c*. Alternatively, in the range required from the above viewpoint, at least a part of each of the output side ground conductor patterns 1250*a*, 1250*b*, 1250*c*, 1250*d*, and 1250*e* (and thus apart or all of each) maybe provided inside (in the inner surface) the output ground recess portions 1254*a*, 1254*b*, 1254*c*, 1254*d*, and 1254*e*.

Further, in the relay substrate 1118 in the above-described embodiment, the output ground recess portions 1254*a*, 1254*b*, 1254*c*, 1254*d*, and 1254*e* extend to both the front surface and the rear surface, but the present invention is not limited thereto. The output ground recess portions 1254*a*, 1254*b*, 1254*c*, 1254*d*, and 1254*e* may be formed to extend (that is, without extending to the signal output side 418*c* necessarily) from at least rear surface, within a range required from the viewpoint of ground strengthening at the signal output side 418*c*.

In the relay substrates 918, 1118 in the above-described embodiment, the side signal conductor patterns 952*a*, 952*b*, 952*c*, and 952*d* respectively extending from the signal conductor patterns 330*a*, 330*b*, 330*c*, and 330*d* formed on the front surface are provided, but the present invention is not limited to this. For example, a corresponding one of the side signal conductor patterns 952*a*, 952*b*, 952*c*, and 952*d* may be provided on the input side surface 418*b* so as to extend from at least one of the signal conductor patterns 330*a*, 330*b*, 330*c*, and 330*d*, according to the adjustment accuracy of the solder amount at each of connection portions between the signal conductor patterns 330*a*, 330*b*, 330*c*, and 330*d* the signal input terminals 124*a*, 124*b*, 124*c*, and 124*d*.

In the above-described embodiments, in the relay substrates 718, 918, 1118, the input side ground conductor patterns 442*a*, 442*b*, 442*c*, 442*d*, and 442*e* extending from the ground conductor patterns 340*a*, 340*b*, 340*c*, 340*d*, and 340*e* have the same widths as the widths of the ground conductor patterns 340*a*, 340*b*, 340*c*, 340*d*, and 340*e* on the signal input side 418*a*, and parts thereof are provided inside (internal surface) the input ground recess portions 750*a*, 750*b*, 750*c*, 750*d*, and 750*e*, but the present invention is not limited to this. The input side ground conductor patterns 442*a*, 442*b*, 442*c*, 442*d*, and 442*e* may have widths narrower than the widths of the ground conductor patterns 340*a*, 340*b*, 340*c*, 340*d*, and 340*e*. Further, at least parts of the input side ground conductor patterns 442*a*, 442*b*, 442*c*, 442*d*, and 442*e* are provided inside (inner surface) the input ground recess portions 750*a*, 750*b*, 750*c*, 750*d*, and 750*e*, or all of them may be provided inside the input ground recess portions 750*a*, 750*b*, 750*c*, 750*d*, and 750*e*.

Similarly, in the relay substrates 918, 1118, the side signal conductor patterns 952*a*, 952*b*, 952*c*, and 952*d* may have widths narrower than the widths of the signal conductor patterns 330*a*, 330*b*, 330*c*, and 330*d*. Further, at least parts of the side signal conductor pattern 952*a*, 952*b*, 952*c*, and 952*d* may be provided inside (inner surface) the signal recess portions 954*a*, 954*b*, 954*c*, and 954*d*, or all of them may be provided inside the signal recess portions 954*a*, 954*b*, 954*c*, and 954*d*.

In the relay substrates 918, 1118, the signal recess portions 954*a* are provided together with the side signal conductor patterns 952*a*, but the present invention is not limited thereto. The input side surface 418*b* may not be provided with the signal recess portion 954*a* and the like, but may be provided with side signal conductor patterns 952*a* and the like. Even in this configuration, since excess solder introduced into the connection portion between the signal conductor patterns 330*a*, 330*b*, 330*c*, and 330*d* and the signal input terminals 124a, 124b, 124c, and 124d is accumulated on the side signal conductor pattern 952a and solidified, the surplus solder can be excluded from the signal conductor patterns 330a, 330b, 330c, and 330d to some extent.

In the above-described embodiment, the signal input terminals 124a, 124b, 124c, and 124d are core wires or center conductors of the electrical connector 116a, but are not limited thereto. For example, the signal input terminals 124a, 124b, 124c, and 124d may be lead pins extending from the bottom surface of the case 114a.

As described above, the optical modulators 100, 1300 described above include the optical modulation element 102 including a plurality of signal electrodes 112a, the housings 104, 1304 that accommodates the optical modulation elements 102, and a plurality of signal input terminals 124a for inputting electrical signals to be applied to the signal electrode 112a. The optical modulators 100, 1300 includes a relay substrate 118 on which a plurality of signal conductor patterns 330a that electrically connect each of the signal input terminals 124a to each of the signal electrodes 112a, and a plurality of ground conductor patterns 340a are formed. The relay substrate 118 and the like are housed in the housing 104 and the like, and at least one input side ground conductor pattern 442a and the like extending from at least one ground conductor pattern 340a and the like are formed on the input side surface 418b having the signal input side 418a on the side where the electrical signal from the signal input terminal 124a and the like is input to the signal conductor pattern 330a and the like as one side.

According to this configuration, since the ground in the vicinity of the signal input side 418a is strengthened by the input side ground conductor pattern 442a, even in a case where the transmission rate exceeds 400 Gb/s, for example, the reflection, radiation, and leakage of the electrical signal at the connection portion between the signal input terminal 124a and the signal conductor pattern 330a is effectively reduced, and thus good optical modulation characteristics in the optical modulation element 102 can be realized.

In the relay substrates 718, 818, 918, and 1118 that can used for the optical modulator 100, the input ground recess portions 750a, 850a extending from the rear surface facing the front surface of the relay substrate 118 on which the signal conductor pattern 330a is formed on the input side surface 418b, and at least a part of the input side ground conductor pattern 442a is provided inside the input ground recess portions 750a, 850a.

According to this configuration, when the relay substrates 718, 818, 918, and 1118 are fixed to the case 114a of the optical modulator 100 with solder or the like, the solder protruding from the relay substrates 718, 818, 918, and 1118 can be retained in the input ground recess portions 750a, and 850a, good electrical connection (for example, ground potential connection) can be secured by fixing the relay substrates 718, 818, 918, and 1118 and the case 114a with an appropriate amount of solder.

Further, in the optical modulator 100, the input ground recess portions 750a of the relay substrates 718, 918, and 1118 extends to both the front surface and the rear surface, and the input side ground conductor pattern 442a is formed inside the input ground recess portion 750a.

According to this configuration, the relay substrates 718, 918, and 1118 can be inexpensively configured as a mechanically uniform and simple configuration in the thickness direction.

In addition, in the relay substrate 918, 1118 that can be used for the optical modulator 100, the input side surface 418b is further formed with at least one side signal conductor pattern 952a extending from at least one signal conductor pattern 330a.

According to this configuration, since surplus solder between the signal conductor pattern 330a and the signal input terminal 124a is guided onto the side signal conductor pattern 952a, solder fixation between the signal conductor pattern 330a and the signal input terminal 124a can be performed uniformly with good reproducibility.

In the relay substrates 918, 1118 used for the optical modulator 100, the input side surface 418b is formed with a signal recess portion 954a extending from the surface on which the signal conductor pattern 330a is formed, and at least a part of each of the side signal conductor pattern 952a is formed inside the signal recess portion 954a.

According to this configuration, since surplus solder between the signal conductor pattern 330a and the signal input terminal 124a can be guided and retained in the signal recess portion 954a, solder fixation between the signal conductor pattern 330a and the signal input terminal 124a can be performed uniformly with good reproducibility.

In addition, on the relay substrate 1118 used for the optical modulator 100, at least one output side ground conductor pattern 1250a extending from at least one ground conductor pattern 340a is provided on the output side surface 418d with the signal output side 418c from which an electrical signal is output from the signal conductor pattern 330a to the signal electrode 112a, as one side.

According to this configuration, the ground in the vicinity of the connection portion to the signal conductor pattern 330a and the signal electrode 112a is strengthened, and high frequency noise propagating from the input side surface 418b to the inside of the relay substrate 1118 is prevented, and good optical modulation characteristics in the optical modulation element 102 can be ensured.

Further, in the relay substrate 1118 used for the optical modulator 100 or the like, an output ground recess portion 1254a extending from the rear surface of the relay substrate 1118 is formed on the output side surface 418d, and at least a part of the output side ground conductor pattern 1250a or the like is provided inside the output ground recess portion 1254a or the like.

According to this configuration, since surplus solder between the relay substrate 1118 and the case 114a can be guided and retained inside the output ground recess portion 1254a, the accuracy required for adjusting the amount of solder is relaxed, and thus, the electrical connection between the relay substrate 1118 and the case 114a can be performed more stably.

In the optical modulator 100, the signal input terminal 124a and the signal conductor pattern 330a are electrically connected by solder, brazing material or conductive adhesive, and the signal conductor pattern 330a and the signal electrode 112a are electrically connected through a conductor wire or a conductor ribbon.

According to this configuration, electrical connection between the signal input terminal 124a and the signal conductor pattern 330a, and electrical connection between the signal conductor pattern 330a and the signal electrode 112a can be performed easily without using a special method.

In the optical modulator 100, the input side surface 418b of the relay substrate 118 abuts against a structure connected to the ground potential, for example, the case 114a or the support 1360, the input side ground conductor pattern 442a provided in the input side surface 418b is electrically connected to the structure.

According to this configuration, it is possible to easily apply to the input side ground conductor pattern 442a, a uniform ground potential having no potential distribution in the plane.

The optical modulator 1300 includes a housing 1304 that houses the optical modulation element 102 and relay substrate 718, and the support 1360, which is the above structure, is connected to the ground potential through the case 1314a of the housing 1304.

According to this configuration, since the support 1360, which is the above structure, is configured separately from the housing 1304, for example, by appropriately selecting the material of the support 1360, which is the above structure, the stress applied to the relay substrate 718 caused by environmental temperature fluctuations can be relaxed to ensure good long-term reliability.

In the optical modulator 100, the structure on which the input side ground conductor pattern 442a of the input side surface 418b such as the relay substrate 118 abuts is the housing 104 of the optical modulator 100 that accommodates the optical modulation element 102 and the relay substrate 118, specifically, the case 114a constituting the housing 104.

According to this configuration, it is possible to easily and directly apply to the input side ground conductor pattern 442a, a uniform ground potential having no potential distribution in the plane, without using additional parts such as the support 1360.

Further, an optical transmission apparatus 1700 according to another aspect of the present invention includes the optical modulator 1702 which is the optical modulator 100 or 1300 including any one of the above-described relay substrates 118, and for example, the modulation signal generation part 1706 and the modulation data generation part 1708 constituting an electronic circuit that outputs an electrical signal for making the optical modulator 1702 perform the modulation operation.

According to this configuration, even in an optical transmission apparatus having a transmission rate exceeding 400 Gb/s, for example, in order to drive the optical modulation element 102, good optical modulation feature can be realized and good optical transmission characteristics can be realized.

What is claimed is:

1. An optical modulator comprising:
an optical modulation element having a plurality of signal electrodes;
a housing that houses the optical modulation element;
a plurality of signal input terminals each of which inputs an electrical signal to be applied to each of the signal electrodes; and
a relay substrate on which a plurality of signal conductor patterns that electrically connect each of the signal input terminals to each of the signal electrodes, and a plurality of ground conductor patterns are formed,
wherein the relay substrate is housed in the housing, and at least one input side ground conductor pattern is provided on a side surface of the relay substrate, which has a side edge on which an electrical signal output from at least one of the signal input terminals is input to at least one of the signal conductor patterns, and
wherein the input side ground conductor pattern is formed to extend from at least one of the ground conductor patterns formed on a front surface of the relay substrate to connect to the ground conductor pattern formed on a rear surface of the relay substrate, which is an opposite face of the front surface.

2. An optical modulator comprising:
an optical modulation element having a plurality of signal electrodes;
a housing that houses the optical modulation element;
a plurality of signal input terminals each of which inputs an electrical signal to be applied to each of the signal electrodes; and
a relay substrate on which a plurality of signal conductor patterns that electrically connect each of the signal input terminals to each of the signal electrodes, and a plurality of ground conductor patterns are formed,
wherein the relay substrate is housed in the housing, and at least one input side ground conductor pattern extending from at least one of the ground conductor patterns is formed on an input side surface having a side on which an electrical signal output from the signal input terminal is input to the signal conductor pattern as one side, and
wherein an input ground recess portion extending from a rear surface of the relay substrate facing a front surface on which the signal conductor pattern is formed is formed on the input side surface, and at least a part of the input side ground conductor pattern is provided inside the input ground recess portion.

3. The optical modulator according to claim 2,
wherein the input ground recess portion extends to both the front surface and the rear surface, and the input side ground conductor pattern is formed inside the input ground recess portion.

4. The optical modulator according to claim 2,
wherein at least one side signal conductor pattern extending from at least one of the signal conductor patterns is further formed on the input side surface.

5. The optical modulator according to claim 4,
wherein a signal recess portion extending from a surface on which the signal conductor patterns are formed is formed on the input side surface, and at least a part of the side signal conductor patterns is formed inside the signal recess portion.

6. The optical modulator according to claim 2,
wherein the relay substrate has at least one output side ground conductor pattern extending from at least one of the ground conductor patterns formed on an output side surface having a side on which an electrical signal output to the signal electrode from the signal conductor pattern as one side.

7. The optical modulator according to claim 6,
wherein an output ground recess portion extending from a rear surface of the relay substrate is formed on the output side surface, and at least a part of the output side ground conductor pattern is provided inside the output ground recess portion.

8. The optical modulator according to claim 2,
wherein the signal input terminal and the signal conductor pattern are electrically connected to each other by using solder, brazing material, or conductive adhesive, and the signal conductor pattern and the signal electrode are electrically connected to each other through a conductor wire or a conductor ribbon.

9. The optical modulator according to claim 2,
wherein the input side surface of the relay substrate is in contact with a structure connected to a ground potential, and an input side ground conductor pattern provided on the input side surface is electrically connected to the structure.

10. The optical modulator according to claim 9, wherein a housing that houses the optical modulation element and the relay substrate is provided, and wherein the structure is connected to a ground potential through the housing.

11. The optical modulator according to claim 9, wherein the structure is a housing that houses the optical modulation element and the relay substrate.

12. An optical transmission apparatus comprising:
the optical modulator according to claim 2; and
an electronic circuit that outputs an electrical signal for causing the optical modulator to perform a modulation operation.

\* \* \* \* \*